US012192518B2

(12) United States Patent
Hemmer et al.

(10) Patent No.: US 12,192,518 B2
(45) Date of Patent: Jan. 7, 2025

(54) VIDEO ENCODING BY PROVIDING GEOMETRIC PROXIES

(71) Applicant: GOOGLE LLC, Mountain View, CA (US)

(72) Inventors: Michael Hemmer, San Francisco, CA (US); Ameesh Makadia, New York, NY (US)

(73) Assignee: GOOGLE LLC, Mountain View, CA (US)

( * ) Notice: Subject to any disclaimer, the term of this patent is extended or adjusted under 35 U.S.C. 154(b) by 400 days.

(21) Appl. No.: 17/443,913

(22) Filed: Jul. 28, 2021

(65) Prior Publication Data

US 2021/0360286 A1 Nov. 18, 2021

Related U.S. Application Data

(62) Division of application No. 16/143,165, filed on Sep. 26, 2018, now Pat. No. 11,109,065.

(51) Int. Cl.
*H04N 19/597* (2014.01)
*H04N 19/186* (2014.01)
*H04N 19/42* (2014.01)

(52) U.S. Cl.
CPC ......... *H04N 19/597* (2014.11); *H04N 19/186* (2014.11); *H04N 19/42* (2014.11)

(58) Field of Classification Search
CPC ...... H04N 19/186; H04N 19/20; H04N 19/42; H04N 19/593; H04N 19/597; G06T 9/001; G06T 9/002; G06T 9/004
See application file for complete search history.

(56) References Cited

U.S. PATENT DOCUMENTS

| 5,818,463 A | 10/1998 | Tao et al. |
| 5,880,737 A | 3/1999 | Griffin et al. |
| 6,518,965 B2 | 2/2003 | Dye et al. |
| 6,593,925 B1 | 7/2003 | Hakura et al. |
| 8,942,283 B2 | 1/2015 | Pace |

(Continued)

FOREIGN PATENT DOCUMENTS

| CN | 101622874 A | 1/2010 |
| EP | 1434171 A2 | 6/2004 |
| WO | 2015177162 A1 | 11/2015 |

OTHER PUBLICATIONS

Thanou et al., "Graph-Based Compression of Dynamic 3D Point Cloud Sequences", IEEE Transactions on Image Processing, IEEE Service Center, Piscataway, NJ, US vol. 25, No. 4, Apr. 1, 2016; 14 pages (Year: 2016).*

(Continued)

*Primary Examiner* — Jessica M Prince
(74) *Attorney, Agent, or Firm* — Brake Hughes Bellermann LLP

(57) ABSTRACT

Compressing a frame of video includes receiving a frame of a video, identifying a three dimensional (3D) object in the frame, matching the 3D object to a stored 3D object, compressing the frame of the video using a color prediction scheme based on the 3D object and the stored 3D object, and storing the compressed frame with metadata, the metadata identifying the 3D object, indicating a position of the 3D object in the frame of the video and indicating an orientation of the 3D object in the frame of the video.

21 Claims, 16 Drawing Sheets

(56) References Cited

U.S. PATENT DOCUMENTS

| | | | |
|---|---|---|---|
| 9,106,977 | B2 | 8/2015 | Pace |
| 10,192,115 | B1 | 1/2019 | Sheffield et al. |
| 2005/0063596 | A1 | 3/2005 | Yomdin et al. |
| 2005/0141762 | A1 | 6/2005 | Zhao et al. |
| 2010/0303150 | A1 | 12/2010 | Hsiung et al. |
| 2011/0032987 | A1 | 2/2011 | Lee et al. |
| 2011/0052045 | A1* | 3/2011 | Kameyama ............... G06T 7/75 |
| | | | 382/154 |
| 2011/0058609 | A1 | 3/2011 | Chaudhury et al. |
| 2012/0170809 | A1 | 7/2012 | Picazo |
| 2014/0198182 | A1 | 7/2014 | Ward et al. |
| 2017/0344850 | A1* | 11/2017 | Kobori .................... G06T 7/248 |
| 2018/0173826 | A1* | 6/2018 | White ..................... G06F 30/00 |
| 2019/0362551 | A1 | 11/2019 | Sheffield et al. |
| 2020/0145661 | A1 | 5/2020 | Jeon et al. |

OTHER PUBLICATIONS

Q. Tan, L. Gao, Y.-K. Lai and S. Xia, "Variational Autoencoders for Deforming 3D Mesh Models," 2018 IEEE/CVF Conference on Computer Vision and Pattern Recognition, Salt Lake City, UT, USA, 2018, pp. 5841-5850, doi: 10.1109/CVPR.2018.00612. (Year: 2018).*

U.S. Appl. No. 13/394,486, filed Jun. 1, 2010, Picazo.

U.S. Appl. No. 12/805,455, filed Jul. 30, 2010, Lee, et al.

U.S. Appl. No. 12/896,051, filed Oct. 1, 2010, Kameyama.

U.S. Appl. No. 15/591,690, filed May 10, 2017, Kobori, et al.

U.S. Appl. No. 15/990,429, filed May 25, 2018, Sheffield, et al.

International Search Report and Written Opinion for Application No. PCT/US2019/051566, mailed on Mar. 3, 2020, 17 pages.

Kundu et al.; "3D-RCNN: Instance-Level 3D Object Reconstuction Via Render-And-Compare"; 2018 IEEE/CVF Conference on Computer Vision and Pattern Recognition, Jun. 18, 2018; pp. 3559-3568.

Song et al.; "IM2PANO3D: Extrapolating 360 Structure and Semantics Beyond the Field of View"; 2018 IEEE/CVF Conference on Computer Vision and Pattern Recognition, Jun. 18, 2018, 18 pages.

Thanou et al.; "Graph-Based Compression of Dynamic 3D Point Cloud Sequences"; IEEE Transactions on Image Processing, IEEE Service Center, Piscataway, NJ, US, vol. 25, No. 4, Apr. 1, 2016; 14 pages.

Yang et al.; "Content-Based 3-D Model Retrieval: A Survey"; IEEE Transactions on Systems, Man, and Cybernetics: Part C: Applications and Reviews, IEEE Service Center, Piscataway, NJ, US; vol. 37, No. 6; Nov. 1, 2007; pp. 1081-1098.

Fathi, Alireza , et al., "Semantic Instance Segmentation via Deep Metric Learning", Arxiv.org (https://arxiv.org/abs/1703.10277), Mar. 30, 2017, 9 pages.

Goodfellow, Ian J., et al., "Generative Adversarial Nets", Arxiv.org (https://arxiv.org/abs/1406.2661), Jun. 10, 2014, 9 pages.

Kingman, Diederik P., et al., "Auto-Encoding Variational Bayes", Arxiv.org (https://arxiv.org/abs/1312.6114), May 1, 2014, 14 pages.

Litany, Or , et al., Arxiv.org (https://arxiv.org/abs/1712.00268), Apr. 3, 2018, 10 pages.

Liu, Shikun , et al., "Learning a Hierarchical Latent-Variable Model of 3D Shapes", Arxiv.org (https://arxiv.org/pdf/1712.00268.pdf), Aug. 4, 2018, 10 pages.

Muller, Karsten , et al., "3D Video Formats and Coding Methods", 2010 IEEE International Conference On Image Processing, ICIP, Sep. 26, 2010, pp. 2389-2392.

Tan, Qingyang , et al., "Variational Autoencoders for Deforming 3D Mesh Models", Arxiv.org (https://arxiv.org/abs/1709.04307), Mar. 29, 2018, 10 pages.

Babu, et al., "Object-based Surveillance Video Compression using Foreground Motion Compensation", 2006 9th International Conference on Control, Automation, Robotics and Vision, pp. 1-6, Jul. 16, 2007.

Han, "Research on Adaptive Extraction of Video Objects and Video Compression Coding", China Doctoral Dissertations Full-text Database (Information Science and Technology), No. 06, pp. 1136-1140, Jun. 15, 2005.

* cited by examiner

VIDEO ENCODING BY PROVIDING GEOMETRIC PROXIES

CROSS REFERENCE TO RELATED APPLICATIONS

This application is a divisional and claims priority to U.S. application Ser. No. 16/143,165, filed on Sep. 26, 2018, the disclosure of which is incorporated by reference herein in its entirety.

FIELD

Embodiments relate to compressing and decompressing three-dimensional (3D) video data.

BACKGROUND

Techniques for video compression are all related by a common approach. Typically, a frame of video is temporally compressed by defining blocks of the frame as residuals (e.g., in terms of a displacement from previous or future frames). This compression technique is generally acceptable (e.g., have minimal artifacts or errors when decompressed) for objects within a frame having residuals that can be characterized by an in-plane rigid transformation (e.g. an object that shifts and rotates in the image plane over time). While this model captures many sources of video dynamics (e.g. camera or scene translation), there are common scenarios for which this is a suboptimal (inefficient or includes excessive artifacts or errors when decompressed) model.

In other words, a typical prediction scheme can reliably predict a pixel/block/patch in a previous and/or a future frame (e.g., a key frame) for use in calculating residuals when objects move mostly linearly and/or have a predictable motion from frame-to-frame. However, when objects have a dynamic non-linear motion from frame-to-frame, typical prediction schemes may not reliably predict a pixel/block/patch in a previous and/or a future frame (e.g., a key frame) for use in calculating residuals. Therefore, using the displacement prediction model will likely result in little compression when objects have a dynamic non-linear motion from frame-to-frame.

SUMMARY

Example implementations describe systems and methods to compress video frames using color prediction by geometric proxy.

In a general aspect a method and a non-transitory computer-readable storage medium having stored thereon computer executable program code which, when executed on a computer system, causes the computer system to perform steps. The steps include receiving a frame of a video, identifying a three dimensional (3D) object in the frame, matching the 3D object to a stored 3D object, compressing the frame of the video using a color prediction scheme based on the 3D object and the stored 3D object, and storing the compressed frame with metadata, the metadata identifying the 3D object, indicating a position of the 3D object in the frame of the video and indicating an orientation of the 3D object in the frame of the video.

Implementations can include one or more of the following features. For example, the compressing of the frame of the video using the color prediction scheme based on the 3D object and the stored 3D object can include generating a first 3D object proxy based on the stored 3D object, transforming the first 3D object proxy based on the 3D object identified in the frame, generating a second 3D object proxy based on the stored 3D object, identifying the 3D object in a key frame of the video, transforming the second 3D object proxy based on the 3D object identified in the key frame, mapping color attributes from the 3D object to the transformed first 3D object proxy, mapping color attributes from the 3D object identified in the key frame to the transformed second 3D object proxy, and generating residuals for the 3D object based on the color attributes for the transformed first 3D object proxy and the color attributes for the transformed second 3D object proxy.

For example, the compressing of the frame of the video using the color prediction scheme based on the 3D object and the stored 3D object can include generating a first 3D object proxy based on the stored 3D object, transforming the first 3D object proxy based on the 3D object identified in the frame, generating a second 3D object proxy based on the stored 3D object, identifying the 3D object in a key frame of the video, transforming the second 3D object proxy based on the 3D object identified in the key frame, mapping color attributes from the 3D object to the transformed first 3D object proxy, and generating residuals for the 3D object based on the color attributes for the transformed first 3D object proxy and default color attributes for the transformed second 3D object proxy.

For example, the compressing of the frame of the video using the color prediction scheme based on the 3D object and the stored 3D object can include generating a first 3D object proxy based on the stored 3D object, encoding the first 3D object proxy using an auto encoder, transforming the encoded first 3D object proxy based on the 3D object identified in the frame, generating a second 3D object proxy based on the stored 3D object, encoding the second 3D object proxy using an autoencoder, identifying the 3D object in a key frame of the video, transforming the encoded second 3D object proxy based on the 3D object identified in the key frame, mapping color attributes from the 3D object to the transformed first 3D object proxy, mapping color attributes from the 3D object identified in the key frame to the transformed second 3D object proxy, and generating residuals for the 3D object based on the color attributes for the transformed first 3D object proxy and the color attributes for the transformed second 3D object proxy.

For example, the compressing of the frame of the video using the color prediction scheme based on the 3D object and the stored 3D object can include generating a first 3D object proxy based on the stored 3D object, encoding the first 3D object proxy using an auto encoder, transforming the encoded first 3D object proxy based on the 3D object identified in the frame, generating a second 3D object proxy based on the stored 3D object, encoding the second 3D object proxy using an autoencoder, identifying the 3D object in a key frame of the video, transforming the encoded second 3D object proxy based on the 3D object identified in the key frame, mapping color attributes from the 3D object to the transformed first 3D object proxy, and generating residuals for the 3D object based on the color attributes for the transformed first 3D object proxy and default color attributes for the transformed second 3D object proxy.

For example, before storing the 3D object, the steps can further include identifying at least one 3D object of interest associated with the video, determining a plurality of mesh attributes associated with the 3D object of interest, determining a position associated with the 3D object of interest, determining an orientation associated with the 3D object of interest, determining a plurality of color attributes associated with the 3D object of interest, and reducing a number of variables associated with the mesh attributes for the 3D object of interest using an autoencoder. Compressing the frame of the video can include determining position coordinates of the 3D object relative to an origin coordinate of a background 3D object in a key frame. The stored 3D object can include default color attributes, and the color prediction scheme can use the default color attributes. The steps can further include identifying at least one 3D object of interest associated with the video, generating at least one stored 3D object based on the at least one 3D object of interest, each of the at least one stored 3D object being defined by a mesh including a collection of points connected by faces, each point storing at least one attribute, the at least one attribute including a position coordinate for the respective point, and storing the at least one stored 3D object in association with the video.

In another general aspect a method and a non-transitory computer-readable storage medium having stored thereon computer executable program code which, when executed on a computer system, causes the computer system to perform steps. The steps include receiving a frame of a video, identifying a three dimensional (3D) object in the frame, matching the 3D object to a stored 3D object, decompressing the frame of the video using a color prediction scheme based on the 3D object and the stored 3D object, and rendering the frame of the video.

Implementations can include one or more of the following features. For example, the decompressing of the frame of the video using the color prediction scheme based on the 3D object and the stored 3D object can include generating a first 3D object proxy based on the stored 3D object, transforming the first 3D object proxy based on the 3D object identified in the frame, identifying the 3D object in a key frame of the video, transforming the second 3D object proxy based on the 3D object identified in the key frame, mapping color attributes from the 3D object to the transformed first 3D object proxy, mapping color attributes from the 3D object identified in the key frame to the transformed second 3D object proxy, and generating color attributes for the 3D object based on the color attributes for the transformed first 3D object proxy and the color attributes for the transformed second 3D object proxy.

For example, the decompressing of the frame of the video using the color prediction scheme based on the 3D object and the stored 3D object can include generating a first 3D object proxy based on the stored 3D object, transforming the first 3D object proxy based on the 3D object identified in the frame, identifying the 3D object in a key frame of the video, transforming the second 3D object proxy based on the 3D object identified in the key frame, mapping color attributes from the 3D object to the transformed first 3D object proxy, generating color attributes for the 3D object based on the color attributes for the transformed first 3D object proxy and default color attributes for the transformed second 3D object proxy.

For example, the decompressing of the frame of the video using the color prediction scheme based on the 3D object and the stored 3D object can include generating a first 3D object proxy based on the stored 3D object, decoding the first 3D object proxy using an autoencoder, transforming the decoded first 3D object proxy based on metadata associated with the 3D object, generating a second 3D object proxy based on the stored 3D object, decoding the second 3D object proxy using an autoencoder, identifying the 3D object in a key frame of the video, transforming the decoded second 3D object proxy based on metadata associated with the 3D object identified in the key frame, mapping color attributes from the 3D object to the transformed first 3D object proxy, mapping color attributes from the 3D object identified in the key frame to the transformed second 3D object proxy, and generating color attributes for the 3D object based on the color attributes for the transformed first 3D object proxy and the color attributes for the transformed second 3D object proxy.

For example, the decompressing of the frame of the video using the color prediction scheme based on the 3D object and the stored 3D object can include generating a first 3D object proxy based on the stored 3D object, decoding the first 3D object proxy using an autoencoder, transforming the decoded first 3D object proxy based on metadata associated with the 3D object, generating a second 3D object proxy based on the stored 3D object, decoding the second 3D object proxy using an autoencoder, identifying the 3D object in a key frame of the video, transforming the decoded second 3D object proxy based on metadata associated with the 3D object identified in the key frame, mapping color attributes from the 3D object to the transformed first 3D object proxy, and generating color attributes for the 3D object based on the color attributes for the transformed first 3D object proxy and default attributes for the transformed second 3D object proxy.

For example, the steps can further include receiving at least one latent representation for a 3D shape using a machine trained generative modeling technique to: determine a plurality of mesh attributes associated with the 3D shape; determining a position associated with the 3D shape; determining an orientation associated with the 3D shape; and determining a plurality of color attributes associated with the 3D shape, and storing the 3D shape as the stored 3D object. The rendering of the frame of the video can include receiving position coordinates of the 3D object relative to an origin coordinate of a background 3D object in a key frame, and positioning the 3D object in the frame using the position coordinates. The steps can further include receiving a neural network used by an encoder of an autoencoder to reduce a number of variables associated with mesh attributes, position, orientation and color attributes for at least one 3D object of interest, regenerating points associated with a mesh for the at least one 3D object of interest using the neural network in a decoder of the autoencoder, the regeneration of the points including regenerating position attributes, orientation attributes and color attributes, and storing the at least one 3D object of interest as the stored 3D object.

In yet another general aspect a method and a non-transitory computer-readable storage medium having stored thereon computer executable program code which, when executed on a computer system, causes the computer system to perform steps for predicting color variance using a proxy. The steps include generating a first 3D object proxy based on a stored 3D object, generating a second 3D object proxy based on the stored 3D object, transforming the first 3D object proxy based on a 3D object identified in a frame of a video, transforming the second 3D object proxy based on the 3D object identified in a key frame of the video, mapping color attributes from the 3D object identified in the frame of the video to the transformed first 3D object proxy, mapping color attributes from the 3D object identified in the key frame to the transformed second 3D object proxy, and generating color data for the 3D object based on the color attributes for the transformed first 3D object proxy and the color attributes for the transformed second 3D object proxy.

Implementations can include one or more of the following features. For example, the steps can further include before transforming the first 3D object proxy, encoding the first 3D object proxy using an autoencoder, and before transforming the second 3D object proxy, encoding the second 3D object proxy using the autoencoder. The steps can further include after transforming the first 3D object proxy, decoding the first 3D object proxy using an autoencoder, and after transforming the second 3D object proxy, decoding the second 3D object proxy using the autoencoder. The generating of the color data for the 3D object can include subtracting the color attributes for the transformed first 3D object proxy from the color attributes for the transformed second 3D object proxy. The generating of the color data for the 3D object can include adding the color attributes for the transformed first 3D object proxy to the color attributes for the transformed second 3D object proxy.

BRIEF DESCRIPTION OF THE DRAWINGS

Example embodiments will become more fully understood from the detailed description given herein below and the accompanying drawings, wherein like elements are represented by like reference numerals, which are given by way of illustration only and thus are not limiting of the example embodiments and wherein.

Figure 1:
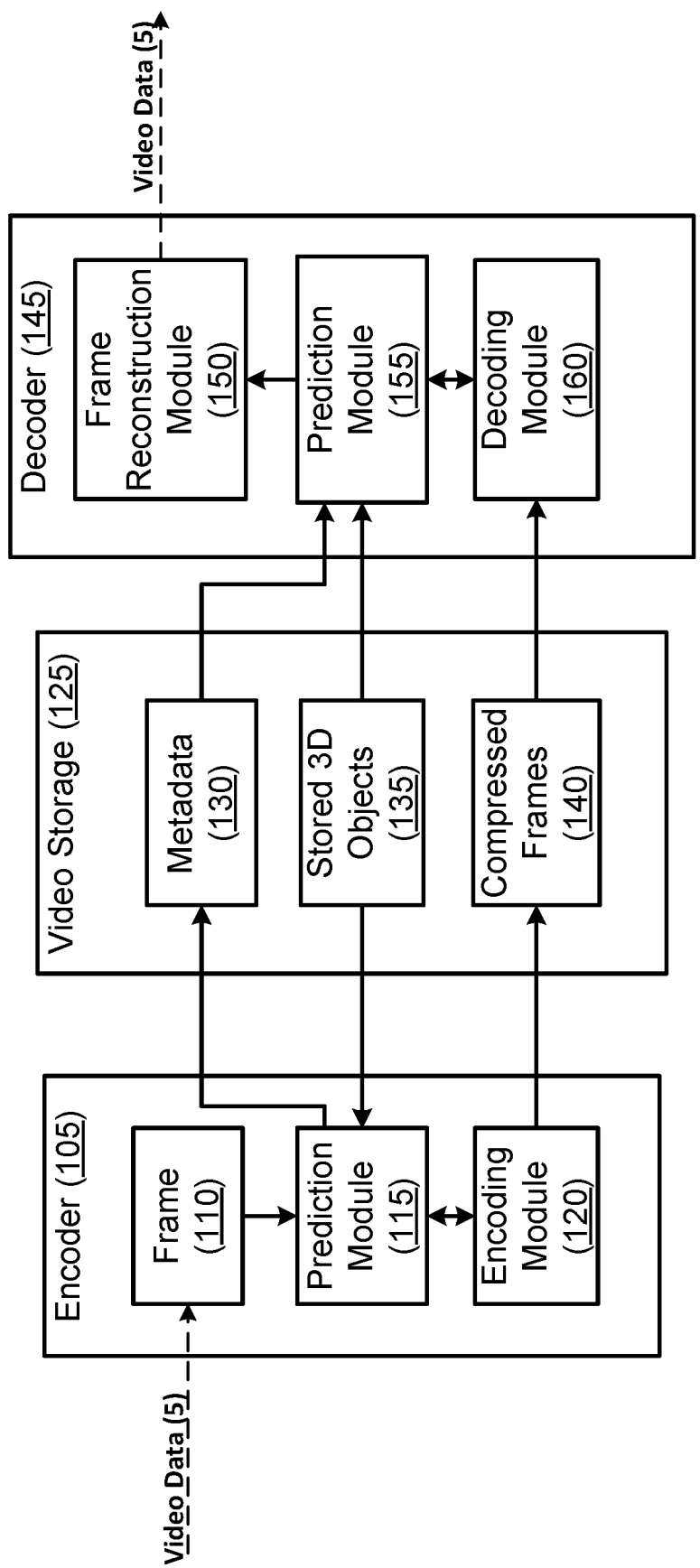
FIG. 1 illustrates a block diagram of a signal flow for compressing a video according to an example implementation.

It should be noted that these Figures are intended to illustrate the general characteristics of methods, structure and/or materials utilized in certain example embodiments and to supplement the written description provided below. These drawings are not, however, to scale and may not precisely reflect the precise structural or performance characteristics of any given embodiment and should not be interpreted as defining or limiting the range of values or properties encompassed by example embodiments. For example, the relative thicknesses and positioning of molecules, layers, regions and/or structural elements may be reduced or exaggerated for clarity. The use of similar or identical reference numbers in the various drawings is intended to indicate the presence of a similar or identical element or feature.

DETAILED DESCRIPTION

While example embodiments may include various modifications and alternative forms, embodiments thereof are shown by way of example in the drawings and will herein be described in detail. It should be understood, however, that there is no intent to limit example embodiments to the particular forms disclosed, but on the contrary, example embodiments are to cover all modifications, equivalents, and alternatives falling within the scope of the claims. Like numbers refer to like elements throughout the description of the figures.

In 3D dynamic environments, 3D objects that undergo complex 3D transformations may not permit a simple rigid transformation based on a previous and/or a future frame, a previously compressed image or frame and the like. For example, a human actor undergoing transformations composed of rigid, articulation, and deformation components will result in a highly nonlinear transformation in the pixel space. Subsequently, there may be no suitable corresponding block in the nearby key frames. These 3D objects are referred to as dynamic 3D objects herein.

Non-dynamic can include 3D objects that appear to be moving from frame-to-frame due to camera or scene translation can be encoded/decoded using color prediction by geometric proxy. In this example, a stationary 3D object can appear to be moving from frame-to-frame because a camera capturing the scene is moving (e.g., in a predictable manner and/or direction). In this example, a 3D object (e.g., a vehicle i.e., a train, an automobile or a plane) can be moving in a predictable manner (e.g., at a constant speed and/or direction) from frame-to-frame. These objects are sometimes referred to herein as translational 3D objects. Another example of non-dynamic 3D objects are 3D objects that appear not to be moving within a scene. In this example, a stationary or fixed 3D object (e.g., a background of the scene, furniture at a fixed position within the scene or a slowly moving object in the distance) can be appear stationary (e.g., without any camera or scene translation) from frame-to-frame. These objects are sometimes referred to herein as fixed or background 3D objects.

Example implementations use stored 3D objects as geometric proxies for objects appearing in videos. The stored 3D objects can be deformable 3D shape models (e.g., a mesh having given attributes that can be manipulated as necessary) that can be used in a prediction scheme. For example, the position of a pixel associated with a dynamic 3D object in a frame of a video can be predicted based on the stored 3D object. Similarly, the prediction scheme can be used to compress a background image in a frame of video, a 3D object that moves (e.g., predictable moves) within an image plane of the frame of video, a portion of the 3D object, a layer (e.g., as part of a Z-order image) of a video frame including a 3D object, a container (e.g., a standard mesh object) including a 3D object, and the like.

One or more implementations can include using the stored 3D object to locate a pixel, block and/or patch in a key frame. One or more implementations can include matching a pixel, block and/or patch in a frame of a video to a pixel, block and/or patch of the stored 3D object. One or more implementations can include compressing the stored 3D object prior to storing the stored 3D object and decompressing the stored 3D object during a prediction process. One or more implementations can include compressing the stored 3D object prior to storing the stored 3D object, compressing a 3D object associated with a frame of video and using the compressed 3D objects during a prediction process.

FIG. 1 illustrates a block diagram of a signal flow for compressing a video according to an example implementation. As shown in FIG. 1, an encoder 105 includes a frame 110, a prediction module 115 and an encoding module 120. Further, a video storage 125 includes metadata 130, stored 3D objects 135 and compressed frames 140.

Video data 5 is input to the encoder 105 where frame 110 is selected from a plurality of frames included in video data 5. The video data 5 can correspond to a 3D video (e.g., a single eye view), a 2D video, a portion of a video (e.g., less than all of the frames of a video), and the like. Therefore, the frame 110 can include data corresponding to a frame of a video. The encoder 105 can be configured to use a color prediction scheme based on using a 3D object as a geometric proxy. The encoder 105 can use the color prediction scheme based on using a 3D object as a geometric proxy to compress frame 110. Compressing the frame 110 can reduce the amount of data used to store and/or communicate the frame 110. Compressing the frame 110 can include a prediction step, a quantization step, a transformation step and an entropy encoding step.

Inter-frame prediction can exploit spatial redundancy elation (e.g., correlation among pixels between frames) by calculating delta values expressed in terms of one or more neighboring frames. The delta coding can include locating correlating pixels/blocks/patches in a key frame (e.g., previous neighboring key frame, upcoming neighboring key frame) and then calculating a delta value for pixels in a frame being encoded. The delta values can be called residuals. Therefore, inter-frame prediction can generate residuals for pixels/blocks/patches (e.g., 3D objects) in a frame. In example implementations, the delta values can be expressed in terms of an explicit texture (color), a default texture, a predefined texture, a texture of an identified 3D object, and/or the like.

The prediction module 115 can be configured to locate a 3D object in the frame 110 and/or a key frame. For example, a machine vision, a computer vision and/or computer image recognition technique can be used to identify and locate the 3D object. Once a 3D object has been identified, the 3D object can be located using a coordinate system (e.g., 2D Cartesian, 3D Cartesian, polar, and/or the like) as an attribute(s) of points associated with the mesh of the identified 3D object.

In an example implementation, a computer image recognition technique based on training (machine-learning) a convolutional neural network using a plurality of known images can be used to identify and locate the 3D object. For example, a block, a plurality of blocks and/or a patch is selected from and/or identified in the selected frame. The trained convolutional neural network can operate on the selected block, plurality of blocks and/or patch. The result can be tested (e.g., error tested, loss tested, divergence tested, and/or the like). If the test results in a value below (or alternatively, above depending on the type of test) a threshold value, the selected block, plurality of blocks and/or patch can be identified as a 3D object.

In an example implementation, the frames of the video can include tags indicating a previously identified 3D object of interest is included in the frame. The tag can include the identity and location of the 3D object. For example, the video can be generated using a computer generated image (CGI) tool (e.g., a computer animated movie). Computer generated characters can be identified and tagged in each frame. Further, a model for each of the identified 3D objects of interest (e.g., the identified characters) can be stored as stored 3D objects 135.

In an example implementation, the stored 3D objects 135 and the 3D object can be defined by a triangular mesh. The triangular mesh can be a collection of points connected by triangular faces. Each point can store various attributes. For example, the attributes can include positions, colors, texture coordinates, and the like of each point. The attributes can include and/or indicate (e.g., a plurality of the attributes can indicate) an orientation of a corresponding 3D object and/or a position of the corresponding 3D object in a frame of a video (e.g., frame 110) and/or image.

Therefore, in an example implementation, mesh attributes of the 3D object can be sufficient to identify and locate the 3D object. A model including mesh attributes for a plurality of 3D objects of interest can be stored as stored 3D objects 135. The model can be standardized. For example, a model for a man, a woman, an adolescent, a child, or more generally a human or portion of a human (e.g., a body, a head, a hand, and/or the like can be stored as stored 3D objects 135. For example, a model for a dog, a cat, a deer, or more generally a four legged animal or portion of a four legged animal (e.g., a body, a head, a leg, and/or the like can be stored as stored 3D objects 135. Attributes of the model can then be used to search the frame for a 3D object having similar attributes.

The 3D object located in the frame 110 (hereinafter referred to as the 3D object) can be matched to one of the stored 3D objects 135. In an example implementation, the identity of the 3D object as generated by the computer image recognition technique can be used to search the stored 3D objects 135. In an example implementation, the tag of a 3D object found in a frame can be matched to a tag of one of the stored 3D objects 135. In an example implementation, the model of one of the stored 3D objects 135 having similar attributes to the 3D object can be identified as a match.

The matched one of the stored 3D objects 135 (hereinafter referred to as the stored 3D object) can then be used in a color prediction scheme for the frame 110. For example, a mesh corresponding to the stored 3D object can be translated and oriented to align with an orientation of the 3D object. Then points corresponding to the translated and oriented stored 3D object can be matched to points of a corresponding (e.g., the same) 3D object located in a nearby (temporally), previously encoded, key frame. Then, the prediction module 115 can use the matched points of the corresponding 3D object to select or predict a pixel/block/patch in the key frame for use in calculating residuals (e.g., color displacement in relation to the key frame) for the 3D object in the frame 110.

In addition, the prediction module 115 can generate metadata 130 associated with the frame 110. The metadata 130 can include data associated with at least one 3D object located in the frame 110 that has been predicted using one of the stored 3D objects 135. The metadata 130 can include attributes (e.g., mesh point attributes) associated with a location and/or an orientation of the 3D object in the frame 110. The metadata 130 is stored relative to (in correspondence with) one of the compressed frames 140 of the video data 5.

The encoding module 120 can be configured to perform a series of encoding processes on the residuals. For example, data corresponding to the residuals can be transformed, quantized and entropy encoded.

Transforming the residuals can include converting the data (e.g., pixel values) from the spatial domain to transform coefficients in a transform domain. The transform coefficients may correspond to a two-dimensional matrix of coefficients that is ordinarily the same size as an original block and/or patch in the frame 110. In other words, there may be as many transform coefficients as data points (e.g., pixels) in the original block and/or patch in the frame 110. However, due to the transform, a portion of the transform coefficients may have values equal to zero. Typically, transforms include the Karhunen-Loève Transform (KLT), the Discrete Cosine Transform (DCT), the Singular Value Decomposition Transform (SVD) and the asymmetric discrete sine transform (ADST).

Vector coordinates (e.g., representing the transform coefficients) are usually given by float or double precision. However, such a representation is often more precise than actually needed. For example, the video data 5 may originate from a video capture device (e.g., camera, scanner, computer generated image program) with some measurement error. Thus, a relatively large number of the lower bits can be noise. Quantization converts the given floats into an b-bit long integer representation. Accordingly, quantization can reduce the data in each transformation coefficient. Quantization may involve mapping values within a relatively large range to values in a relatively small range, thus reducing the amount of data needed to represent the quantized transform coefficients. The quantization may convert the transform coefficients into discrete quantum values, which are referred to as quantized transform coefficients or quantization levels. For example, quantization may add zeros to the data associated with a transformation coefficient. For example, an encoding standard may define 128 quantization levels in a scalar quantization process.

Expected values of the information contained in the quantized transform coefficients (e.g., a data set of discrete quantum values). The higher the number of unique values a data set contains, the higher the entropy is. Repeated values reduce the entropy and a better compression. Accordingly, the quantized transform coefficients can be entropy encoded. Entropy coding is performed using one of a set of techniques for compressing a data set based on its entropy. For example entropy coding techniques can include Huffman coding, arithmetic coding or using asymmetric numeral systems.

The entropy-encoded coefficients (for all pixels/blocks/patches in frame 110), together with the information required to decode the frame 110 (e.g., the type of prediction used, motion vectors and quantizer value) are then output as one of the compressed frames 140 and stored together with and/or in association with other compressed frames of the video data 5.

Typically, the encoder 105 and video storage 125 are elements in the Cloud or World Wide Web. For example, the encoder 105 can be one of a plurality of encoders implemented as computer hardware and/or computer software implemented in a cloud computing device an configured to compress video data (e.g., video data 5) using a compression scheme defined by one or more standard (e.g., H.264, H.265, HEVC, VP8, VP9, VP10, AV1, and the like). For example, the video storage 125 can be implemented as at least one non-volatile memory, non-transitory computer readable medium, and the like located in a cloud computing device (e.g., a streaming server). In at least one implementation, the encoder 105 compresses the video data 5, as a video, and stores the compressed video data for a future (e.g., later in time) playing back of the video during a streaming of the from the cloud computing device to a client device.

In this implementation, the client device includes a decoder (e.g., decoder 145). In some implementations, the metadata 130 and/or the stored 3D objects 135 can be communicated to the client device. The metadata 130 and/or the stored 3D objects 135 can be communicated to the client device on-demand and/or as an initialization process. The metadata 130 and/or the stored 3D objects 135 can be compressed as stored in the video storage 125 and/or on-demand prior to being communicated to the client device. In an example implementation, the stored 3D objects 135 can be compressed using a machine trained generative modeling technique to generate a reduced number of variables (referred to herein as a latent representation or a reduced latent representation) associated with the mesh attributes and position for the stored 3D object (as described in more detail below).

Accordingly, as shown in FIG. 1, the decoder 145 includes a frame reconstruction module 150, a prediction module 155 and a decoding module 160. The decoding module 160 can be configured to perform the inverse of the encoding module 120. The decoding module 160 can receive compressed frames 140 (e.g., representing a 3D movie selected for streaming or download by a user of a client device including the decoder 145). The compressed frames 140 can be received one at a time, a plurality or block of frames at a time, or as a complete 3D movie. The decoder 145 can select one of the compressed frames 140 and the decoding module 160 can entropy decode, inverse quantize and inverse transform the selected compressed frame.

In an example implementation, the decoding module 160 uses the data elements within the selected compressed frame and decompresses the data elements by entropy decoding (using, for example, the inverse of Huffman coding, arithmetic coding or asymmetric numeral systems coding) to produce a set of quantized transform coefficients. Dequantizing the quantized transform coefficients, and inverse transforming (e.g., using an inverse of the KLT, the DCT, the SVD or the ADST) the dequantized transform coefficients to generate derivative residuals that can be identical to (or approximately identical to) the residuals generated by the prediction module 115.

The prediction module 155 can be configured to determine if the selected compressed frame includes one of the stored 3D objects 135. In an example implementation, the metadata 130 can be used in determining if the selected compressed frame includes one of the stored 3D objects 135. For example, the prediction module 155 can query the metadata 130 for the selected compressed frame and if metadata is returned, the selected compressed frame is determined to include one of the stored 3D objects 135.

The prediction module 155 can be configured to identify a 3D object, a position (e.g., location) of the 3D object and an orientation of the 3D object for the selected compressed frame based on the returned metadata. The prediction module 155 can be configured to select a stored 3D object from the stored 3D objects 135 (hereinafter referred to as the stored 3D object) and use the stored 3D object to decompress the selected frame.

In an example implementation, a mesh corresponding to the stored 3D object can be translated and oriented based on the identified position (e.g., location) of the 3D object and the identified orientation of the 3D object. Then points corresponding to the translated and oriented stored 3D object can be matched to points of a corresponding (e.g., the same) 3D object located in a nearby (temporally), previously decoded, key frame. Then, the prediction module 155 can use the matched points of the corresponding 3D object to select or predict a pixel/block/patch in the key frame for use in regenerating (e.g., calculating) color values and/or color attributes for the translated and oriented stored 3D object based on the residuals at the identified position in the selected frame.

The prediction module 155 can be further configured to regenerate (e.g., calculate) color values and/or color attributes for the remainder of the selected frame based on the residuals or the remainder of the selected frame and the corresponding pixels/blocks/patches of the key frame. The frame reconstruction module 150 can be configured to reconstruct the selected frame based on the regenerated color values and/or color attributes for the translated and oriented stored 3D object and the regenerated color values and/or color attributes for the remainder of the selected frame. In an example implementation, the frame reconstruction module 150 can be configured to stitch the regenerated color values and/or color attributes for the translated and oriented stored 3D object into the regenerated color values and/or color attributes for the remainder of the selected frame based on the identified position of the 3D object.

Example implementations can include identifying two or more 3D objects, regenerating color values and/or color attributes for each of the two or more 3D objects and reconstructing the selected frame using each of the two or more 3D objects. The frame reconstruction module 150 can be configured to regenerate the video data 5 based on a plurality of reconstructed frames. The video data 5 can be rendered (e.g., texture data and color data), and color corrected for display on a display of the client device.

Compressing video (or video frames) using an encoder configured to use a color prediction scheme based on using a 3D object as a geometric proxy (e.g., encoder 105) may not result in the highest compression rate (e.g., smallest data size) for a video, a frame of video or a plurality of video frames. Accordingly, example implementations may include compressing the video, the frame of video or the plurality of video frames using two or more encoders each capable of compressing video data using an identified color prediction scheme.

Figure 2:
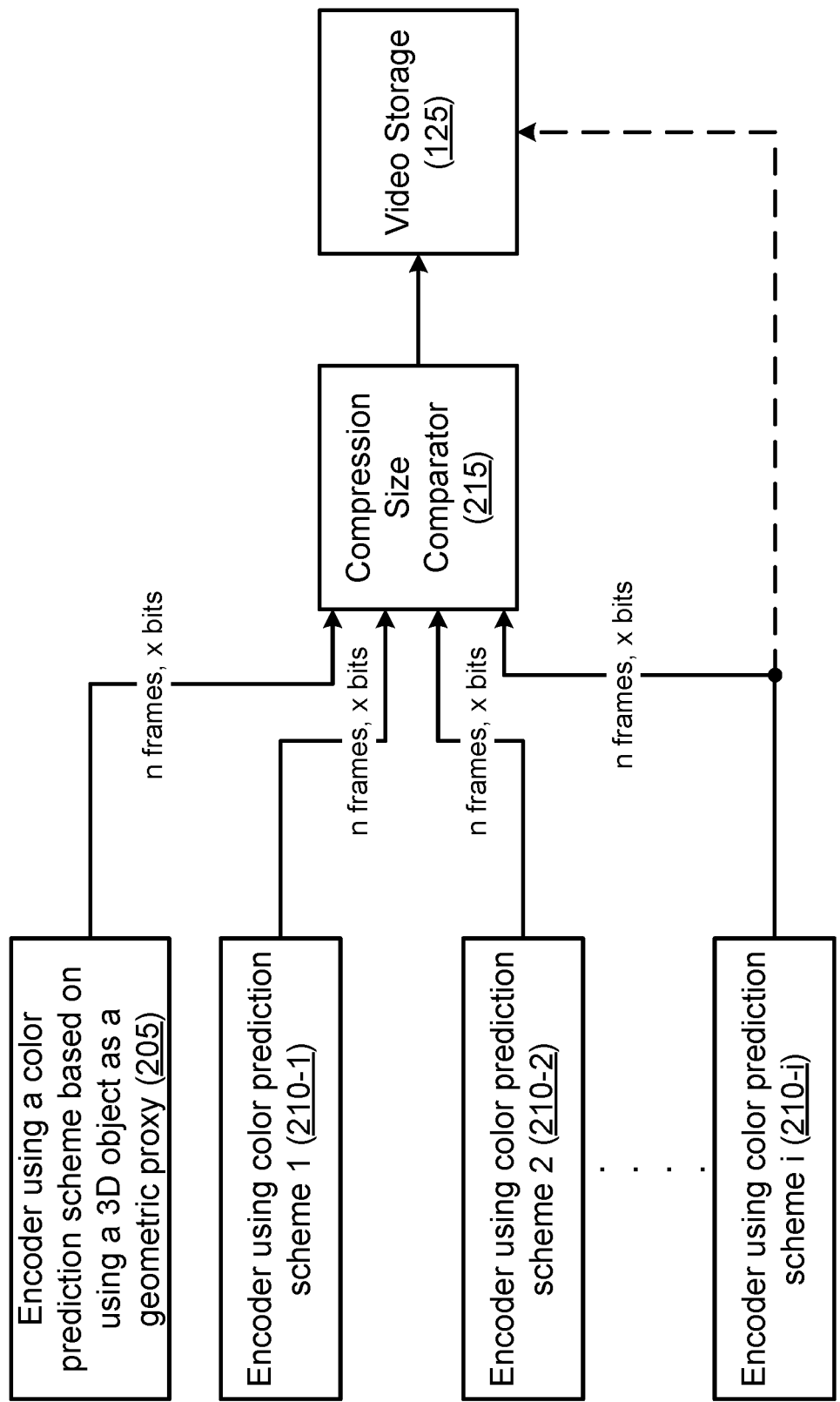
FIG. 2 illustrates a block diagram of a signal flow for storing a compressed video according to an example implementation.

FIG. 2 illustrates a block diagram of a signal flow for storing a compressed video (and/or compressed frame(s) of a video) according to an example implementation. As shown in FIG. 2, a first encoder 205 is an encoder that uses a color prediction scheme based on using a 3D object as a geometric proxy (e.g., encoder 105). Further, at least one second encoder 210-1 is an encoder that uses color prediction scheme 1, at least one second encoder 210-2 is an encoder that uses color prediction scheme 2, and at least one second encoder 210-$i$ is an encoder that uses color prediction scheme i. Each of the first encoder 205 and the at least one second encoder 210-1, 210-2, . . . , 210-$i$ can be configured to generate and communicate n frames having x bits total to a compression size comparator 215. Color prediction scheme 1, 2, . . . , i can be a default prediction scheme for an encoding standard, a configurable prediction scheme for an encoding standard, a custom prediction scheme based on temporal displacement, an alternative prediction scheme based on using a 3D object as a geometric proxy, and the like.

The compression size comparator 215 can be configured to select one of the outputs of the first encoder 205, the at least one second encoder 210-1, 210-2, . . . , or 210-$i$ for saving in the video storage 125 (e.g., for later streaming to a client device). In an example implementation, the encoder output can be selected based on compression efficiency. For example, the compressed video (and/or compressed frames of a video) having the fewest number of bits (e.g., smallest value for x) can be saved.

In another example implementation, a color prediction scheme can be a preferred prediction scheme. In this implementation, the compressed video (and/or compressed frame(s) of a video) of the preferred color prediction scheme is saved unless some condition exists. For example, the condition can be based on compression efficiency. The output of the first encoder 205 could be selected unless an output of one of the at least one second encoder 210-1, 210-2, . . . , 210-$i$ is at least a threshold percent (e.g., 10%, 15%, 20%, and the like) more efficient than the output of the first encoder 205. If more than of the at least one second encoder 210-1, 210-2, . . . , 210-$i$ is at least a threshold percent (e.g., 10%, 15%, 20%, and the like) more efficient than the output of the first encoder 205, the most efficient (e.g., smallest value for x) of the at least one second encoder 210-1, 210-2, . . . , 210-$i$ can be saved.

In an example implementation, the signal flow for storing a compressed video (and/or compressed frame(s) of a video) illustrated in FIG. 2 can be executed on a video frame-by-frame and/or on a set of frames. For example, each frame of a video can be encoded as described above. Then, the compression size comparator 215 can select the encoder output based on efficiency or based on the conditionally preferred color prediction scheme. In an example implementation, a key frame can be used to select between frame-by-frame or a set of frames compression. For example, In an example implementation, one of the encoder outputs can always be saved. For example, a default color prediction scheme can be saved to ensure backward compatibility. In FIG. 2, this implementation is illustrated as the dashed line from the at least one second encoder 210-$i$.

The signal flow for storing a compressed video (and/or compressed frame(s) of a video) illustrated in FIG. 2 can be executed multiple times utilizing different coding standards. For example, the signal flow illustrated in FIG. 2 can be executed using two or more of the H.264, H.265, HEVC, VP8, VP9, VP10, AV1, and the like coding standards. Accordingly, the color prediction scheme based on using a 3D object as a geometric proxy (e.g., encoder 105) can be implemented in two or more coding standards and on the same video (e.g., video data 5). Therefore, video storage 125 can store a plurality of instances of a video (and/or compressed frame(s) of a video) each having been compressed using a different standard and/or different configuration of a standard. As a result, a streaming server can serve the video based on the capabilities of the requesting client device and/or the network over which the video is to be communicated.

Figure 3A:
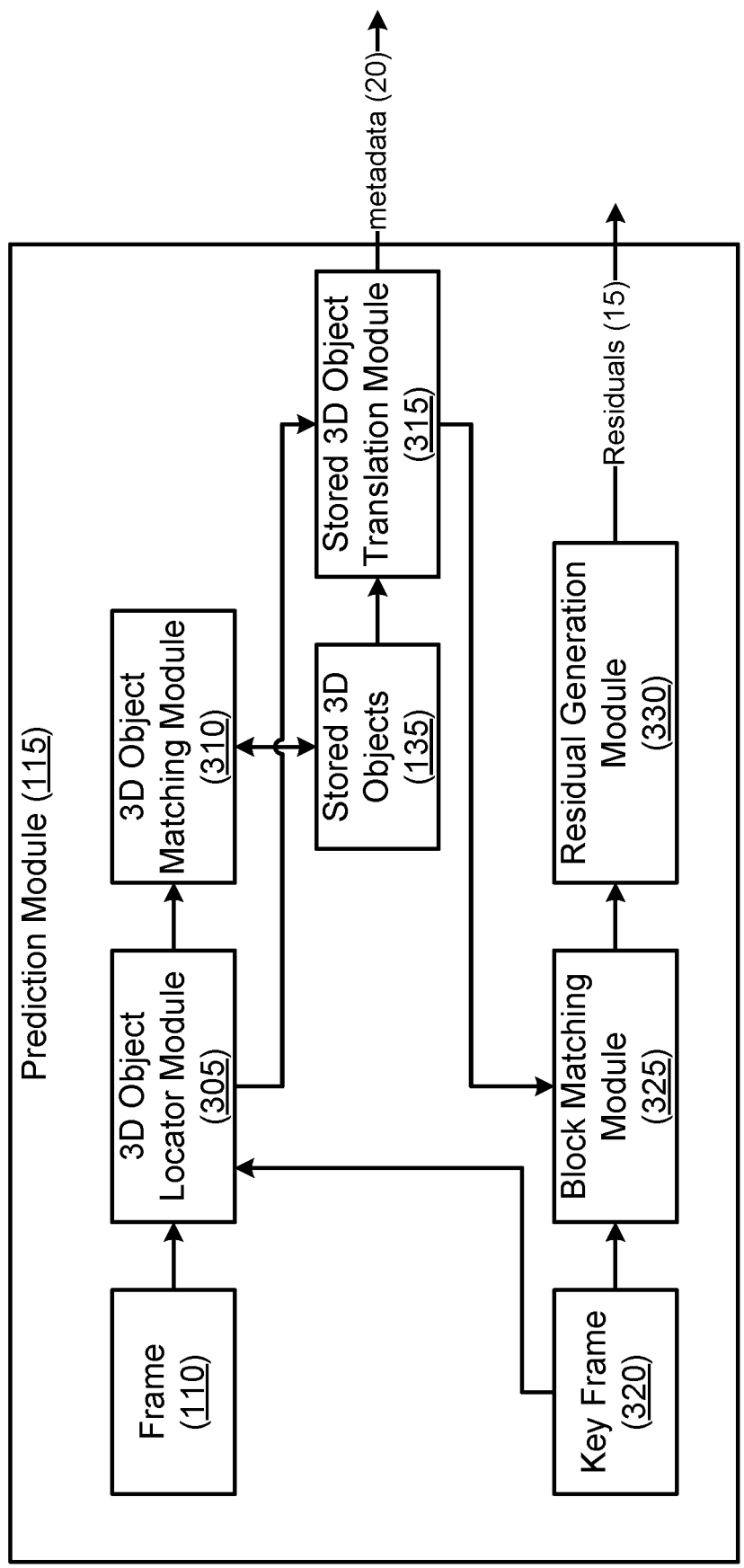
FIG. 3A illustrates a block diagram of an encoder prediction module according to an example implementation.

FIG. 3A illustrates a block diagram of an encoder prediction module according to an example implementation. As shown in FIG. 3A, the prediction module 115 includes the frame 110, a 3D object locator module 305, a 3D object matching module 310, the stored 3D objects 135, a stored 3D object translation module 315, a key frame 320, a block matching module 325 and a residual generation module 330.

In an example implementation, the stored 3D objects 135 and a 3D object in the frame 110 can be defined by a triangular mesh. The triangular mesh can be a collection of points connected by triangular faces. Each point can store various attributes. For example, the attributes can include positions, colors, texture coordinates, and the like of each point. The attributes can include and/or indicate (e.g., a plurality of the attributes can indicate) an orientation of a corresponding 3D object and/or a position of the corresponding 3D object in the frame 110 of a video and/or image.

The 3D object locator module 305 can be configured to identify and locate a 3D object in the frame 110 and the key frame 320 (hereinafter referred to as the 3D object). For example, a machine vision technique, a computer vision technique, a computer image recognition technique and/or the like can be used to identify and locate a 3D object in the frame 110 and the key frame 320. Once a 3D object has been identified, the 3D object can be located using a coordinate system (e.g., 2D Cartesian, 3D Cartesian, polar, and/or the like) as an attribute(s) of points associated with the mesh of the identified 3D object).

In an example implementation, a computer image recognition technique based on training (machine-learning) a convolutional neural network using a plurality of known images can be used to identify the 3D object. For example, a block, a plurality of blocks and/or a patch is selected from and/or identified in the selected frame. The trained convolutional neural network can operate on the selected block, plurality of blocks and/or patch. The result can be tested (e.g., error tested, loss tested, divergence tested, and/or the like). If the test results in a value below (or alternatively, above depending on the type of test) a threshold value, the selected block, plurality of blocks and/or patch can be identified as a 3D object.

In an example implementation, frames of the video that include a previously identified 3D object of interest can also include (e.g., in a header, in frame metadata, and the like) tags indicating the previously identified 3D object of interest is included in the frame. The tag can include the identity and location (e.g., coordinate attributes of points associated with the mesh) of the 3D object. For example, the video can be generated using a computer generated image (CGI) tool (e.g., a computer animated movie). Computer generated characters can be identified and tagged in each frame. Further, a model (e.g., defined by a triangular mesh) for each of the identified 3D objects of interest (e.g., characters in the animated movie) can be stored as stored 3D objects 135.

In an example implementation, mesh attributes of the 3D object can be sufficient to identify and locate the 3D object. A model including mesh attributes for a plurality of generic 3D objects of interest can be stored in (or in association with) the 3D object locator module. The model can be standardized. For example, a model for a man, a woman, an adolescent, a child, or more generally a human or portion of a human (e.g., a body, a head, a hand, and/or the like can be stored as stored. For example, a model for a dog, a cat, a deer, or more generally a four legged animal or portion of a four legged animal (e.g., a body, a head, a leg, and/or the like can be stored as stored. Attributes of the model can then be used to search the frame for a 3D object having similar attributes.

The 3D object matching module 310 can be configured to match the 3D object located in the frame 110 (hereinafter referred to as the 3D object) to one of the stored 3D objects 135. In an example implementation, a computer image recognition technique was used by the 3D object locator module 305 to identity the 3D object. Identifying the 3D object can also include assigning a unique ID from a datastore of ID's to the 3D object. The unique ID can be used to search the stored 3D objects 135 for the 3D object. If the unique ID is found in the stored 3D objects 135, the corresponding one of the stored 3D object is a match for the 3D object.

In an example implementation, the tag of a 3D object found in a frame can be unique (e.g., having a one-to-one relationship between the tag and the 3D object) to the 3D object. The tag can be used to search the stored 3D objects 135 for the 3D object. If the tag is found in the stored 3D objects 135, the corresponding one of the stored 3D object is a match for the 3D object.

In an example implementation, the model of one of the stored 3D objects 135 having similar attributes to the 3D object can be identified as a partial match. The stored 3D objects 135 can then be filtered based on the partial match. Then one or more attributes or combination of attributes of the 3D object can be used to search the stored 3D objects 135 for the 3D object. If the one or more attributes or combination of attributes is found in the stored 3D objects 135, the corresponding one of the stored 3D object is a match for the 3D object. The one or more attributes or combination of attributes can uniquely identify the 3D object in relation to the stored 3D objects 135 with a relatively high level of certainty. For example, a shape or relative position of a body part (e.g., face shape, nose shape, relative position of eyes, nose and mouth, and the like), the color of hair or skin of a cartoon character, the shape and relative location of an object (e.g., jewelry) warn by a character, type of vehicle (e.g., automobile, tractor, and the like), and the like may uniquely identify the 3D object in relation to the stored 3D objects 135 (e.g., if the stored 3D objects 135 corresponds to the set of 3D objects of interest for the video).

If no match is found for the 3D object in the stored 3D objects by the 3D object matching module 310, the prediction module 115 may use a standard prediction technique as defined by the coding standard. In other words, a color prediction scheme based on using a 3D object as a geometric proxy may not be used for the 3D object.

If no match is found for the 3D object in the stored 3D objects 135 by the 3D object matching module 310, the 3D object matching module 310 may be configured to add the 3D object to the stored 3D objects 135. For example, the 3D object matching module 310 may be configured to assign a unique ID or unique tag to the 3D object and define a model (e.g., a triangular mesh including points and corresponding attributes) for the 3D object. The model can then be stored as one of the stored 3D objects 135 and identified by the unique ID or unique tag.

In an example implementation, the stored 3D objects 135 may have predefined mesh representations and or data structures. Therefore, the model may have a size (e.g., number of points, number faces, number of vertices and the like), a number of attributes, type of attributes, and the like predefined based on a design of the stored 3D objects 135.

Further, matching the 3D object to a 3D object in the stored 3D objects 135 may include redefining the 3D object based on the design of the stored 3D objects 135 by the 3D object matching module 310 before searching for a match in the stored 3D objects 135.

The stored 3D object translation module 315 can be configured to translate (or transform) the matched one of the stored 3D objects 135 (hereinafter referred to as the stored 3D object). For example, a mesh corresponding to the stored 3D object can be translated and oriented to align with an orientation of the 3D object. Translating and orienting together can be referred to as transforming. The stored 3D object translation module 315 can be configured to transform the matched one of the stored 3D objects 135 associated with the frame 110 and the key frame 320. Therefore, the stored 3D object translation module 315 can be configured to generate and transform a first 3D object proxy based on the stored 3D object for the 3D object associated with the frame 110. Further, the stored 3D object translation module 315 can be configured to generate and transform a second 3D object proxy based on the stored 3D object for the 3D object associated with the key frame 320.

Transforming a 3D proxy can include by articulating mesh points (e.g., like a skeleton), using an autoencoder to generate a latent representation (as discussed below) and positioning values associated with the latent representation, sending control points and values for Bezier, or NURBS surfaces, or subdivision surfaces. Each mesh can have a predefined connectivity. The predefined connectivity can allow a direct correspondence between points of two meshes in different poses. So we can use the same texture parameterization for the two meshes.

The stored 3D object translation module 315 can be configured to generate metadata 20. Metadata 20 includes information identifying the stored 3D object and information related to the translation and orientation of the stored 3D object. The information related to the translation and orientation of the stored 3D object can be used to perform the same translation and orientation of the stored 3D object in the future (e.g., by decoder 145). In an example implementation, the metadata is generated and stored for both the first 3D object proxy and the second 3D object proxy.

The block matching module 325 can be configured to match points of the translated and oriented stored 3D object of the frame 110 corresponding to the translated and oriented stored 3D object of the key frame 320. In an example implementation, the block matching module 325 can be configured to wrap a mesh (e.g., a 3D mesh) representing a translated and oriented stored 3D object with color and/or texture attributes. For example, the block matching module 325 can be configured to map color attributes from the 3D object identified in the frame 110 to the transformed first 3D object proxy. Further, the block matching module 325 can be configured to map color attributes from the 3D object identified in the key frame 320 to the transformed second 3D object proxy. Mapping color attributes from the 3D object identified in the frame 110 to the transformed first 3D object proxy can include converting the 3D object from a 3D space (e.g., an XYZ space) to a 2D space (e.g., a UV space) and or converting the 3D object identified in the frame 110 from a 2D space (e.g., a UV space) to a 3D space (e.g., an XYZ space).

Each mesh can have a predefined connectivity. The predefined connectivity can allow a direct correspondence between points of two meshes in different poses. So we can use the same texture parameterization for the two meshes. Therefore, mapping color attributes can include identifying a pixel in a frame (e.g., frame 110 and/or key frame 320) based on the pixels coordinates in the frame and then setting the color attribute of a point in the mesh representation of the transformed 3D object proxy having the same coordinates to the same color values of the identified pixel. In an example implementation more than one frame can be used to generate pixel attributes. Further, pixel attributes from a regenerated frame (e.g., from a regeneration loop in an encoder) can be used to generate pixel attributes.

In an example implementation pixel attributes can be blended. Blending pixel attributes (or textures) can be done using a per texel average the corresponding texel from those textures that have info on that texel, texels from different textures may have confidence value (e.g. timewise distance between the current frame and the frame the texture was generated from), unobserved texels in a specific texture may also be predicted (which lowers their confidence), for the current frame, use the new pose of the mesh and it's textures to obtain a prediction of (a part of) the current frame, and/or the like.

In some cases, the frame 110 and/or key frame 320 may not have a pixel corresponding to a point on the mesh representation of the transformed 3D object proxy. Therefore, the mesh representation of the transformed 3D object proxy can retain a default color attribute for these points. Accordingly, any residual color calculations can be based on the default color attributes.

Then, the block matching module 325 can use the matched points of the corresponding 3D object to select or predict a pixel/block/patch in the key frame 320 for use in generating residuals 15 for the 3D object in the frame 110. In an example implementation, before translating and matching, the 3D object, the stored 3D object and/or the 3D object proxy can be encoded (described in more detail below) using an autoencoder. Encoding the stored 3D object or 3D object proxy converts the 3D object, the stored 3D object and/or the 3D object proxy into a latent representation. The latent representation includes fewer values (e.g., points) than the mesh representing the 3D object, the stored 3D object and/or the 3D object proxy. Therefore, translating the 3D object, the stored 3D object and/or the 3D object proxy as a latent representation includes manipulating fewer points. Further, mapping color attributes includes mapping fewer points when the 3D object, the stored 3D object and/or the 3D object proxy is encoded as a latent representation.

The residual generation module 330 can be configured to generate (or calculate) residuals 15 (e.g., color displacement in relation to the key frame 320) for the 3D object in the frame 110. For example, the residual generation module 330 can generate residuals 15 by subtracting the pixel attribute values for each point in the triangular mesh for the 3D object from the pixel attribute values for each matched point of the predicted pixel/block/patch in the key frame 320. In an example implementation, color attributes of a point in the mesh representation of the first 3D object proxy can be subtracted from color attributes of a corresponding point (e.g., having the same point identification or being in the same position in the mesh sequence) in the mesh representation of the second 3D object proxy.

In an example implementation, the encoder 105 includes a reconstruction path (not shown). The reconstruction path includes several components or software implementations that together decode a frame using at least one inverse process of the encoding process described above. For example, the reconstruction path can include, at least, an inverse quantization process and an inverse transform process. The reconstructed frame generated in the reconstruction path can be used in place of the key frame 320 when encoding a next sequential frame. Encoding the original frame incurred some loss. Therefore, the reconstructed frame generated in the reconstruction path includes some artifacts (e.g., error) as compared to the original frame. These artifacts may or may not be corrected for in the prediction module 115. In some implementations, the artifacts generated using the reconstructed frame may be corrected by the color correction module 635 described below.

Figure 3B:
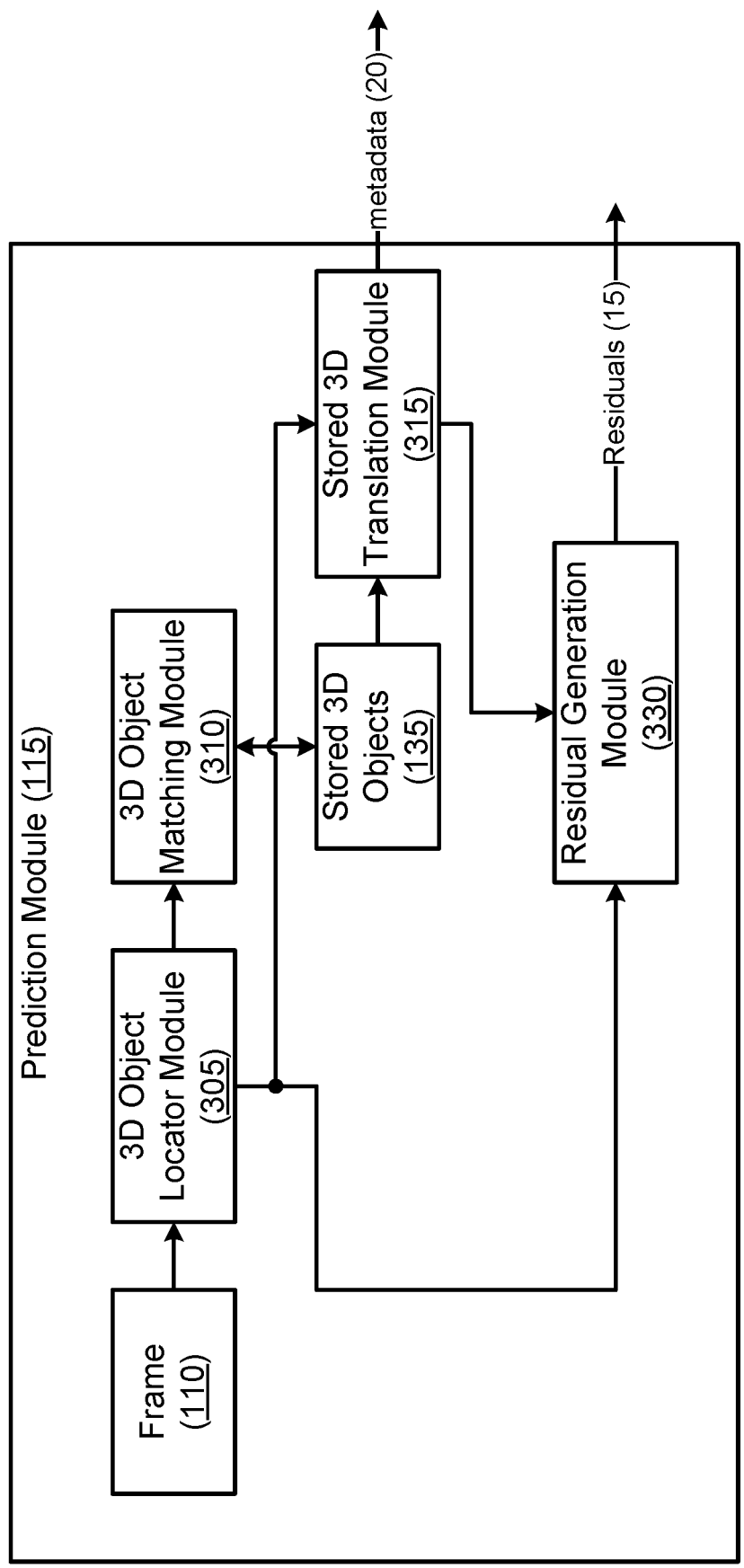
FIG. 3B illustrates a block diagram of another encoder prediction module according to an example implementation.

FIG. 3B illustrates a block diagram of another encoder prediction module according to an example implementation. As shown in FIG. 3B, the prediction module 115 includes the frame 110, the 3D object locator module 305, the 3D object matching module 310, the stored 3D objects 135, the stored 3D object translation module 315, the block matching module 325 and the residual generation module 330.

The implementation of the prediction module 115 shown in FIG. 3B is substantially the same as the prediction module 115 shown in FIG. 3A. However, the prediction module 115 shown in FIG. 3B does not generate residuals 15 based on a key frame. Instead, the residual generation module 330 of the prediction module 115 shown in FIG. 3B uses the 3D object and the translated and oriented stored 3D object to generate residuals 15.

In an example implementation, the translated and oriented stored 3D object has a direct point-to-point relationship to the 3D object. In other words, a point (e.g., with position attributes $x_1$, $y_1$, $z_1$) in the triangular mesh defining the translated and oriented stored 3D object has a corresponding point (e.g., with position attributes $x_1$, $y_1$, $z_1$) in the triangular mesh defining the 3D object. Therefore, the colors attributes can be used to determine a relative color displacement between the 3D object and the stored 3D object. Accordingly, the residual generation module 330 can be configured to generate (or calculate) residuals 15 (e.g., color displacement) for the 3D object in the frame 110 based on the stored object. For example, the residual generation module 330 can generate residuals 15 by subtracting the pixel attribute values for each point in the triangular mesh for the 3D object from the pixel attribute values for corresponding point in the triangular mesh for the translated and oriented stored 3D object.

In an example implementation, the translated 3D object proxy based on the stored 3D object for the 3D object associated with the frame 110 (e.g., the aforementioned first 3D object proxy) that has been mapped with the colors of the frame 110 and the stored 3D object with default color attributes can be used to generate residuals. Accordingly, color attributes of a point in the mesh representation of the first 3D object proxy can be subtracted from color attributes of a corresponding point (e.g., having the same point identification or being in the same position in the mesh sequence) in the mesh representation of the stored 3D object.

Figure 4A:
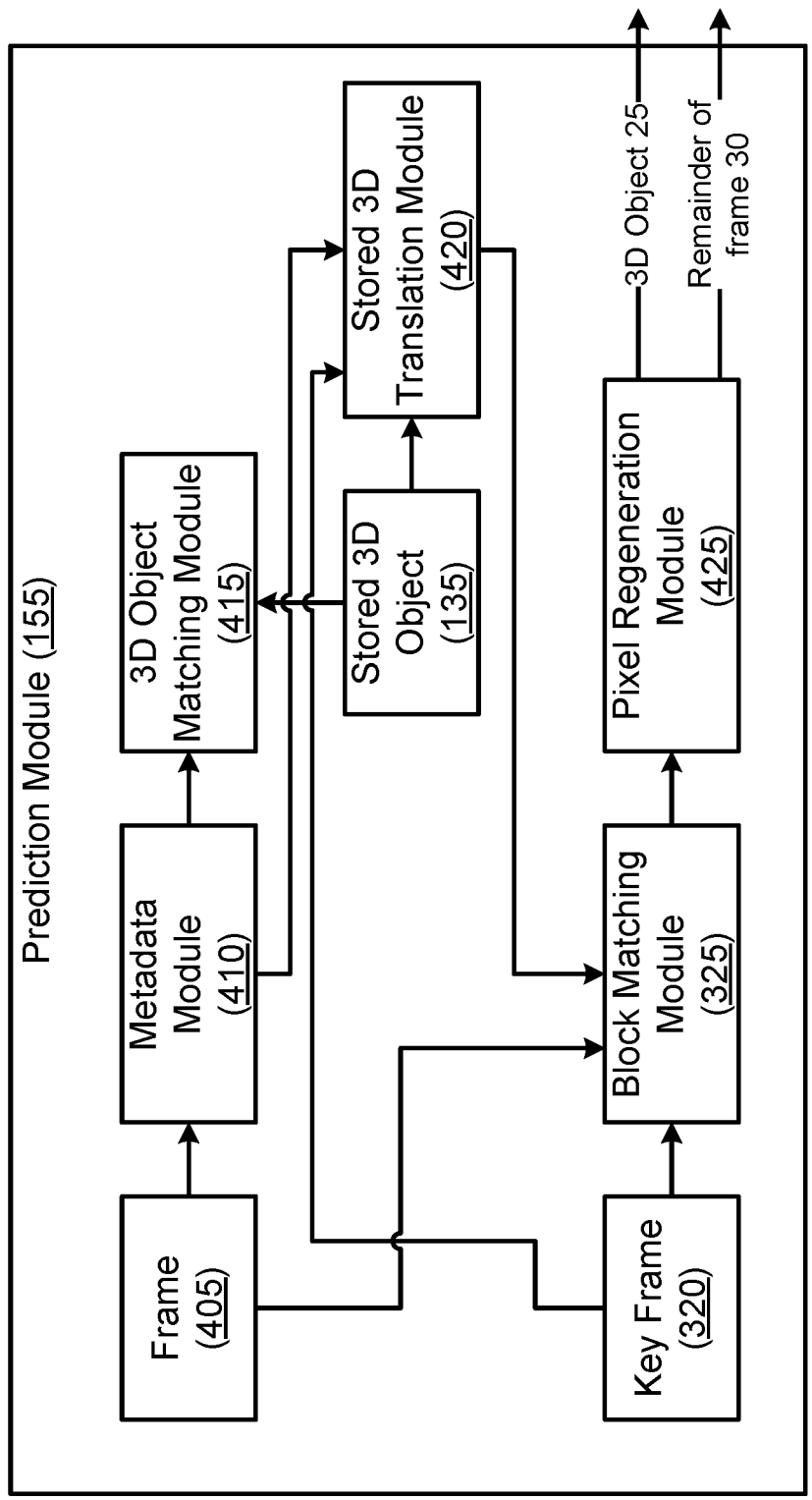
FIG. 4A illustrates a block diagram of a decoder prediction module according to an example implementation.

FIG. 4A illustrates a block diagram of a decoder prediction module according to an example implementation. As shown in FIG. 4A, the prediction module 155 includes a frame 405, a metadata module 410, a 3D object matching module 415, the stored 3D objects 135, a stored 3D object translation module 420, the key frame 320, the block matching module 325 and a pixel regeneration module 425.

The frame 405 is a compressed frame selected from the compressed frames 140 as a frame to be decompressed. The key frame 320 is a decompressed key frame associated with frame 405 (nearby, earlier in time and/or later in time). The frame 405 has been entropy decoded, inverse quantized and inverse transformed by the decoding module 160. Therefore, the frame 405 can include derivative residuals that can be identical to (or approximately identical to) the residuals generated by the prediction module 115.

The metadata module 410 can be configured to determine if frame 405 includes metadata and/or has an associated metadata (e.g., metadata 130). The metadata module 410 can be configured to read the metadata from a header associated with the frame 405. The metadata can include metadata 20. The metadata can include data associated with at least one 3D object located in the frame 405 that has been predicted using one of the stored 3D objects 135. The metadata can include attributes (e.g., mesh point attributes) associated with a location and/or an orientation of the 3D object in the frame 405. The metadata can include information identifying the stored 3D object and information related to the translation and orientation of the stored 3D object. The information related to the translation and orientation of the stored 3D object can be used to perform the same translation and orientation of the stored 3D object that was performed by the stored 3D object translation module 315.

The 3D object matching module 415 can be configured to match the 3D object located in the frame 405 (hereinafter referred to as the 3D object) to one of the stored 3D objects 135. In an example implementation, the metadata module 410 outputs a unique ID or tag that can be used to search the stored 3D objects 135 for the 3D object. If the unique ID or tag is found in the stored 3D objects 135, the corresponding one of the stored 3D objects 135 (hereinafter referred to as the stored 3D object) is a match for the 3D object.

The stored 3D object translation module 420 can be configured to translate the stored 3D object. For example, a mesh corresponding to the stored 3D object can be translated and oriented to align with an orientation of the 3D object as the 3D object was oriented in the frame 405 before the frame 405 was compressed. In other words, the mesh corresponding to the stored 3D object can be translated and oriented to align with the orientation of the 3D object as the 3D object was oriented in the frame 110. The stored 3D object translation module 420 can be configured to translate the stored 3D object based on the information related to the translation and orientation of the stored 3D object included in the metadata.

The stored 3D object translation module 420 can be configured to translate the matched one of the stored 3D objects 135 associated with the frame 405 and the key frame 320. Therefore, the stored 3D object translation module 315 can be configured to generate first 3D object proxy based on the stored 3D object for the 3D object associated with the frame 405. Further, the stored 3D object translation module 315 can be configured to generate a second 3D object proxy based on the stored 3D object for the 3D object associated with the key frame 320. In an example implementation, the second 3D object proxy can be generated once per key frame 320 and then used for each associated frame 405.

The block matching module 325 can be configured to match points of the translated and oriented stored 3D object of the frame 405 corresponding to the translated and oriented stored 3D object of the key frame 320. In an example implementation, the block matching module 325 can be configured to map color attributes from the 3D object identified in the frame 110 to the transformed first 3D object proxy. Further, the block matching module 325 can be configured to map color attributes from the 3D object identified in the key frame 320 to the transformed second 3D object proxy. Mapping color attributes from the 3D object identified in the frame 110 to the transformed first 3D object proxy can include converting the 3D object from a 3D space (e.g., an XYZ space) to a 2D space (e.g., a UV space) and or converting the 3D object identified in the frame 110 from a 2D space (e.g., a UV space) to a 3D space (e.g., an XYZ space).

In an example implementation, mapping color attributes can include identifying a pixel in a frame (e.g., frame 405 and/or key frame 320) based on the pixels coordinates in the frame and then setting the color attribute of a point in the mesh representation of the transformed 3D object proxy having the same coordinates to the same color values of the identified pixel. In some cases, the frame 405 and/or key frame 320 may not have a pixel corresponding to a point on the mesh representation of the transformed 3D object proxy. Therefore, the mesh representation of the transformed 3D object proxy can retain a default color attribute for these points. Accordingly, any residual color calculations can be based on the default color.

Then, the block matching module 325 can use the matched points of the corresponding 3D object to select or predict a pixel/block/patch in the key frame 320 for use in regenerating pixels for the 3D object in the frame 405. The pixel regeneration module 425 can be configured to generate (or calculate) pixel values for the 3D object 25 in the frame 405. For example, the pixel regeneration module 425 can generate pixel values by adding the pixel attribute values for each point in the triangular mesh for the 3D object from the pixel attribute values for each matched point of the predicted pixel/block/patch in the key frame 320 to color values and/or color attributes for the translated and oriented stored 3D object based on the residuals at the identified position in the selected frame.

In an example implementation, the 3D object, the stored 3D object and/or the 3D object proxy have been encoded using an auto encoder. Therefore, before translating and matching, the 3D object, the stored 3D object and/or the 3D object proxy can be decoded (described in more detail below) using an autoencoder. decoding the stored 3D object or 3D object proxy converts a latent representation of the 3D object, the stored 3D object and/or the 3D object proxy into a regenerated mesh representation.

The pixel regeneration module 425 can be further configured to regenerate (e.g., calculate) color values and/or color attributes for the remainder of the selected frame based on the residuals or the remainder of the selected frame and the corresponding pixels/blocks/patches of the key frame.

Figure 4B:
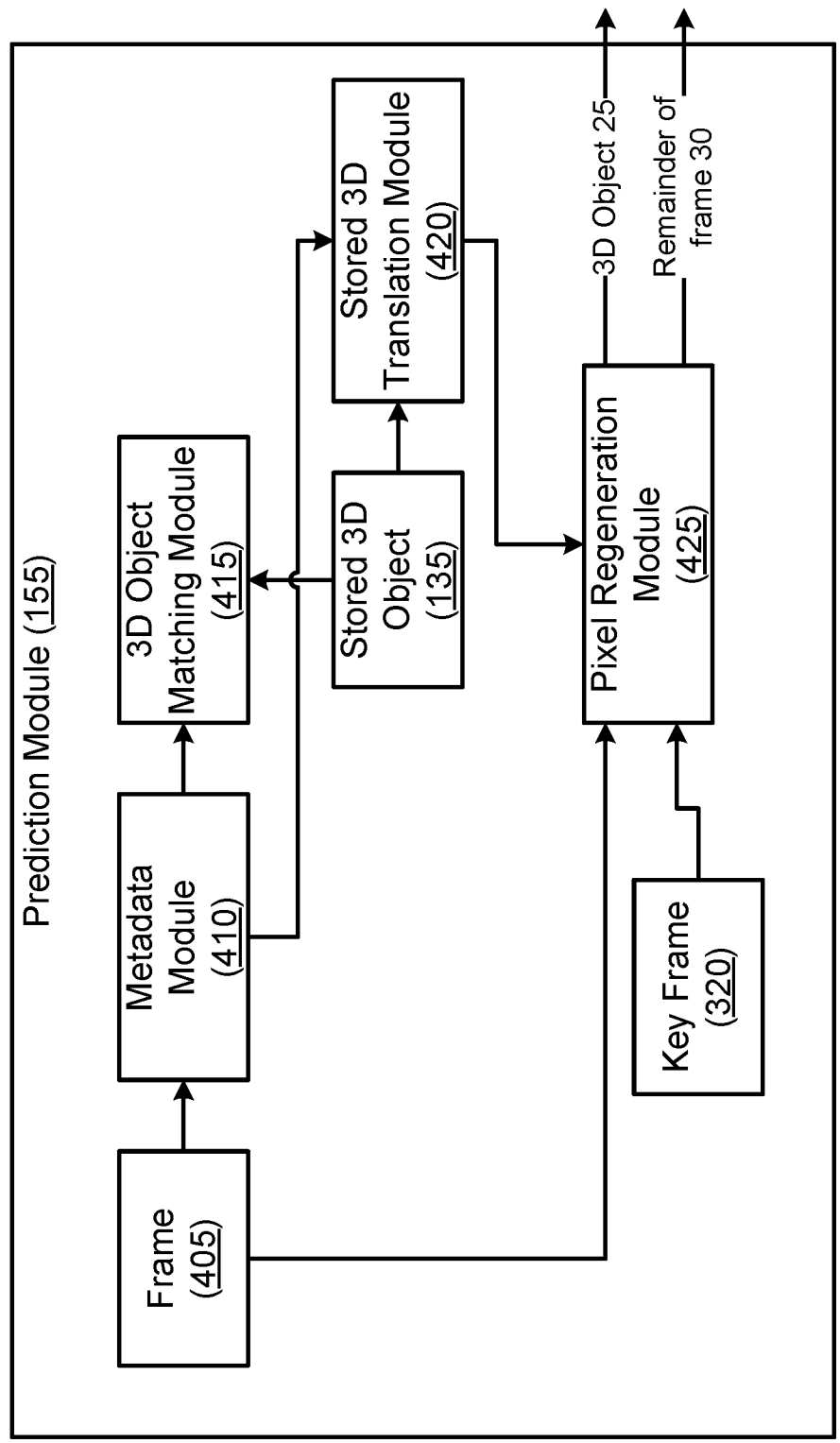
FIG. 4B illustrates a block diagram of another decoder prediction module according to an example implementation.

FIG. 4B illustrates a block diagram of another decoder prediction module according to an example implementation. As shown in FIG. 4B, the prediction module 155 includes the frame 405, the metadata module 410, the 3D object matching module 415, the stored 3D objects 135, the stored 3D object translation module 420, the key frame 320, the block matching module 325 and a pixel regeneration module 425.

The implementation of the prediction module 155 shown in FIG. 4B is substantially the same as the prediction module 155 shown in FIG. 4A. However, the prediction module 155 shown in FIG. 4B does not regenerate color values for the 3D object based on a key frame. Instead, the pixel regeneration module 425 of the prediction module 155 shown in FIG. 4B uses the 3D object and the translated and oriented stored 3D object to regenerate color values for the 3D object.

In an example implementation, the translated and oriented stored 3D object has a direct point-to-point relationship to the 3D object. In other words, a point (e.g., with position attributes $x_1, y_1, z_1$) in the triangular mesh defining the translated and oriented stored 3D object has a corresponding point (e.g., with position attributes $x_1, y_1, z_1$) in the triangular mesh defining the 3D object. Therefore, the color attributes of the translated and oriented stored 3D object can be used to determine color values of the 3D object.

Accordingly, the pixel regeneration module 425 can be configured to generate (or calculate) color values for the 3D object in the frame 405 based on the stored object. For example, the pixel regeneration module 425 can regenerate color values by adding the pixel values for each point in the triangular mesh for the 3D object read from frame 405 to the color attribute values for corresponding point in the triangular mesh for the translated and oriented stored 3D object. The translated and oriented stored 3D object with the calculated color attribute values is then output as the 3D object 25 which is a regenerated 3D object. The remainder of the frame 30 is regenerated as described above with regard to FIG. 4A.

As mentioned above, each of the stored 3D objects 135 can be defined by a triangular mesh. The triangular mesh can be a collection of points connected by triangular faces. Each point can store various attributes. For example, the attributes can include positions, colors, texture coordinates, and the like of each point. Although a triangular mesh structure is referenced above, other polygonal shapes can also be used to define the stored 3D objects 135. In addition, the attributes for each point can include additional attributes that may or may not useful in the context of this disclosure.

In an example implementation, the stored 3D objects 135 can include 3D objects of interest for a CGI movie. Therefore, the stored 3D objects 135 is likely to include 3D models or mesh data and corresponding attribute values for a significant number of 3D characters. Typically, 3D characters can include CGI actors (e.g., lead roles, supporting roles, and extras) CGI pets, CGI creatures, CGI monsters and the like. As discussed above, each of these 3D characters can be 3D objects of interest stored as 3D models or mesh data stored in the stored 3D objects 135. Each of the 3D characters can include a unique ID or tag.

In some implementations, portions of the 3D objects of interest can be stored as 3D models or mesh data stored in the stored 3D objects 135. Each of the portions of the 3D characters can include a unique ID or tag. For example, at least one 3D character (e.g., lead roles and supporting roles) can have an associated 3D model or mesh data representing the at least one 3D characters head or face and another associated 3D model or mesh data representing the at least one 3D characters body (noting the head, face or body could be divided into smaller segments as well). By dividing the character into portions, a relatively higher level of detail can be stored for portions of the character that can be more dynamic (e.g., head, arms and/or legs) as compared to portions of the character that can be comparatively less dynamic (e.g., torso and/or shoulders)

Further, the mesh data can be configured to fit into a standard 3D model. For example, a first cubic model can be a standard size intended to fit the model of a head and a second cubic model can be a standard size intended to fit the model of a hand. Other standard shaped 3D models can include a sphere, a rectangular prism, an oblong prism, a pyramid, cylinder and the like. For example, an arm or a leg could use a rectangular prism 3D model or a cylinder 3D model. The standard 3D model can also place a limit (maximum and/or minimum) on a number of points (e.g., vertices) used to define the 3D object.

Dividing portions of the character and storing each portion as a unique 3D object of interest in the stored 3D objects 135 can cause the size of the stored 3D objects 135 to grow exponentially. However, a 3D model or mesh data representing a portion of a character could be used for many characters. For example, a torso model representing the torso of character A could also be used for character B. The stored 3D objects 135 could also include metadata identifying a 3D model or mesh data representing a standard portion of a character as well as some deforming information corresponding to the standard portion for that character. As a result, the 3D model or mesh data representing the standard portion. For example, one 3D model representing a torso could be used as a 3D model representing a torso for character A as a tall skinny man and as a 3D model representing a torso for character B as a short husky man.

As the number of stored 3D objects 135 increases (e.g., for a full-length CGI animated movie having many characters using a significant number of 3D standard models), so does the amount of resources (e.g., memory) necessary to store the stored 3D objects 135. For example, a streaming server can store 10's of thousands, 100's of thousand, and millions of videos. As the demand for videos including 3D videos increases (e.g., in virtual reality, augmented reality, 3D CGI movies, and the like) the percentage of videos stored (often as left eye and right eye 2D video) at the streaming server will certainly increase. Therefore, as the techniques described herein are implemented for use with the increased number of videos. The number of stored 3D objects 135 is sure to increase and the amount of resources (e.g., memory) necessary to store the stored 3D objects 135 will increase. Further, communicating the stored 3D objects 135 from the streaming server to client devices may require a significant amount of bandwidth during the streaming activity. Therefore, efficiently encoding and decoding stored 3D objects 135 can become desirable for streaming operations.

Figure 5A:
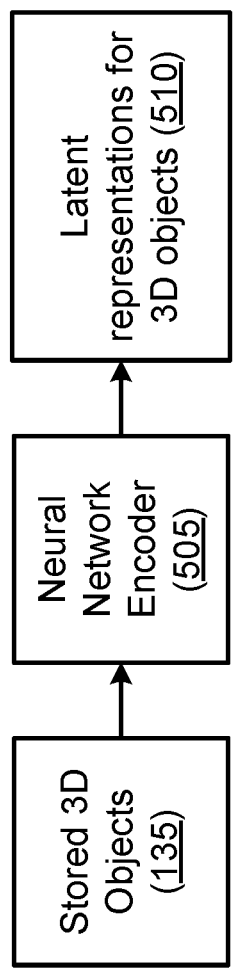
FIG. 5A illustrates a block diagram of a signal flow for encoding a 3D object according to an example implementation.

FIG. 5A illustrates a block diagram of a signal flow for encoding a 3D object according to an example implementation. As shown in FIG. 5A, encoding a 3D object can include, at least, the stored 3D objects 135, a neural network encoder 505 and latent representations for 3D objects 510.

As mentioned above, each of the stored 3D objects 135 can be defined by a triangular mesh. The triangular mesh can be a collection of points or vertices connected by triangular faces. Each point can store various attributes. In an example implementation, the number of points or vertices can be limited to a value The neural network encoder 505 can compress a 3D object using generative modeling techniques. Example implementations of generative modeling techniques can include a variational and/or convolutional autoencoder (VAE), a generative adversarial network (GAN) and/or a combination VAE-GAN. Although these generative modeling techniques are mentioned and/or discussed, example implementations are not limited thereto. Further, although a neural network type encoder is discussed as an implementation used to compress a 3D object, other implementations of encoding 3D objects (including triangular meshes) are within the scope of this disclosure.

The neural network encoder 505 can compress a 3D object defined by a mesh with a fixed number of vertices and fixed connectivity into a comparatively small number of variables sometimes referred to as a latent space. For example, a VAE can be configured to learn a compact latent space for 3D shapes (e.g., 3D shapes on which the VAE has been trained). The neural network of the neural network encoder 505 and the neural network of the neural network decoder 515 both can be a machine trained neural network and/or a machine trained convolutional neural network.

The neural network of the neural network encoder 505 can include coefficients associated with one or more convolutions and/or filters to be applied to the mesh in order to encode the mesh. Each convolution can have C filters, a K×K mask (K representing a convolution) and a stride factor. The coefficients can correspond to one or more of the C filters, the K×K mask and the stride factor. For example, the K×K mask can be a 3×3 mask. The 3×3 mask includes nine (9) variables used in performing a convolution on the mesh. In other words, the 3×3 mask has nine (9) blocks each including a variable. The variables can each be one of the coefficients.

The neural network of the neural network encoder 505 can have layers with differing numbers of neurons. The K×K spatial extent can include K columns and K (or L) rows. The K×K spatial extent can be 2×2, 3×3, 4×4, 5×5, (K×L) 2×4 and so forth. Convolution includes centering the K×K spatial extent on a mesh point and convolving all of the mesh points in the spatial extent and generating a new value for the mesh point based on all (e.g., the sum of) the convolution of all of the mesh points in the spatial extent. The spatial extent is then moved to a new mesh point based on a stride and the convolution is repeated for the new mesh point. The stride can be, for example, one (1) or two (2) where a stride of one moves to the next mesh point and a stride of two skips a mesh point.

The VAE can use the position coordinates for each point of the mesh (e.g., a relatively large amount of data for most 3D shapes of any interest or having a visually significant amount of detail) as input to the neural network encoder 505 and generate a reduced (preferably a relatively small) number of variables (e.g., from 64 to 128 variables) by convolving the neural network with the position coordinates for each point of the mesh. The configuration of the C filters, the K×K mask and the stride factor for the neural network can determine the number of variables in the latent space for the latent representations for 3D objects 510.

Figure 5B:
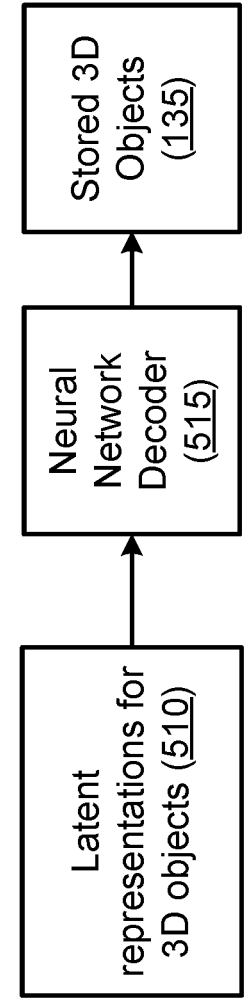
FIG. 5B illustrates a block diagram of a signal flow for decoding a 3D object according to an example implementation.

FIG. 5B illustrates a block diagram of a signal flow for decoding a 3D object according to an example implementation. As shown in FIG. 5B, decoding a 3D object can include, at least, the latent representations for 3D objects 510, a neural network decoder 515, and the stored 3D objects 135. The latent representations for 3D objects 510 can be the latent representations for 3D objects 510 generated by encoding the stored 3D objects 135 using the neural network encoder 505.

The neural network of the neural network decoder 515 can include coefficients associated with one or more convolutions and/or filters to be applied to the mesh in order to encode the mesh. Each convolution can have C filters, a K×K mask (K representing a convolution) and a stride factor. The coefficients can correspond to one or more of the C filters, the K×K mask and the stride factor. For example, the K×K mask can be a 3×3 mask. The 3×3 mask includes nine (9) variables used in performing a convolution on the mesh. In other words, the 3×3 mask has nine (9) blocks each including a variable. The variables can each be one of the coefficients.

The neural network of the neural network decoder 515 can have layers with differing numbers of neurons. The K×K spatial extent can include K columns and K (or L) rows. The K×K spatial extent can be 2×2, 3×3, 4×4, 5×5, (K×L) 2×4 and so forth. Convolution includes centering the K×K spatial extent on a mesh point and convolving all of the mesh points in the spatial extent and generating a new value for the mesh point based on all (e.g., the sum of) the convolution of all of the mesh points in the spatial extent. The spatial extent is then moved to a new mesh point based on the upsample factor and the convolution is repeated for the new mesh point. The upsample factor can be, for example, one (1) or two (2) where a stride factor of one moves to the next mesh point and an stride factor of two skips a mesh point.

Convolution may include one or more zero-padded convolution operations and a reorganize of coefficients. In an example implementation, zero padding includes filling zeros in between non-zero pixels and coefficient reorganization can include a convolution with a K×K mask rotated 180 degrees centered at the zero filled pixels.

The VAE can use variables in the latent space for the latent representations for 3D objects 510 as input to the neural network decoder 515 and regenerate the position coordinates for each point of the mesh. The configuration of the C filters, the K×K mask and the stride factor for the neural network can determine the number of points of the meshes that are regenerated.

Therefore, neural network decoder 515 can be configured to use the variables of a corresponding one of the latent representations for 3D objects 510 to reproduce an approximation of a shape and/or a model of the 3D object before the 3D object was compressed by the neural network encoder 505. The neural network decoder 515 can be configured to generate an approximation of the 3D model corresponding to one of the stored 3D objects 135 including generating position coordinates of points in a mesh with same number of vertices and connectivity as the one of the stored 3D objects 135 before being compressed by the neural network encoder 505.

According to an example implementation, each of the stored 3D objects 135 can be defined by a mesh having a same number of points each having position coordinates. Further the VAE can include a neural network encoder 505 and a neural network decoder 515 each including a neural network having a same configuration of C filters, K×K mask and stride factor for the neural network. As a result, the number of variables in the latent space for each of the latent representations for 3D objects 510 generated by the neural network encoder 505 is the same. Further, the number of points in the meshes that are regenerated by the neural network decoder 515 is the same.

In the example implementation described above, the stored 3D objects 135 can include 3D objects of interest for a CGI movie. Therefore, the stored 3D objects 135 is likely to include 3D models or mesh data and corresponding attribute values for a significant number of 3D characters. As described above, the 3D models can represent the entirety of a 3D object of interest and/or a portion of the 3D object of interest. The entirety of the 3D object of interest and/or a portion of the 3D object of interest can be represented using a standard 3D model.

In this example implementation, the stored 3D objects 135 corresponds to 3D objects of interest to the CGI movie (e.g., as video data 5) and may not include any other 3D objects that are not included in the CGI movie. Typically, a supervised machine learning approach machine learns one or more rules or functions to map between example inputs and desired outputs as predetermined by an operator. The supervised machine learning approach and the semi-supervised learning approach can use a data set that is labelled. Therefore, machine-training or training the neural network encoder 505 and the neural network decoder 515 can be done using the supervised machine learning approach or the semi-supervised learning approach with the stored 3D objects 135 (e.g., each 3D object is labeled with a unique ID and/or tag) as input data and comparison data.

A number of training iterations used during the training process can yield approximately logarithmic gains in accuracy of the reconstructed mesh. Therefore, in a semi-supervised learning approach a threshold based on time, error (e.g., loss) and/or a number of iterations can be used to stop further training. For example, the threshold can be set to a reconstruction error or loss based on the number of points and position coordinates of a reconstructed mesh. In an example implementation, the reconstruction error can be a loss based on a shape reconstruction loss ($L_r$) and a regularization prior loss ($L_p$).

The shape reconstruction loss ($L_r$) can be based on an achieving a nearly identity transformation between the neural network encoder 505 and the neural network decoder 515. The shape reconstruction loss ($L_r$) can be calculated based on pointwise distances between the stored 3D objects 135 generated in FIG. 5B and the stored 3D objects 135 of FIG. 5A. The regularization prior loss ($L_p$) can be calculated using a divergence algorithm based on a variational or prior iteration distribution of a vector based on the stored 3D objects 135 of FIG. 5A over the latent variables and the divergence algorithm is further based on a distribution of the latent variables. VAE loss or total loss becomes $L=L_r+\lambda t_p$ where $\lambda \geq 0$ and controls a similarity of the variational distribution to a prior variational distribution.

In an example implementation, the training process includes training the neural network encoder 505 and the neural network decoder 515 by iterating sequentially through the signal flow for encoding a 3D object as shown in FIG. 5A and the signal flow for decoding the 3D object as shown in FIG. 5B. Continuing the example above, the stored 3D objects 135 corresponding to the 3D objects of interest to the CGI movie. After each iteration (e.g., encoding and decoding of each of the stored 3D objects 135), the stored 3D objects 135 generated in FIG. 5B (e.g., as reconstructed 3D objects) are compared to the stored 3D objects 135 of FIG. 5A. In an example implementation, a reconstruction error can be calculated based on a loss based on a shape reconstruction loss ($L_r$) and a regularization prior loss ($L_p$). If the reconstruction error is above a threshold value (as described above), variables for coefficients that correspond to one or more of the C filters, the K×K mask and the stride factor for at least one of the neural network encoder 505 and the neural network decoder 515 can be revised. Further, the variable $\lambda$ associated with calculating the VAE loss can be revised. In an example implementation, the variables can be revised based on variable values and results for a previous iteration and variable values and results for the current revision. After the variable revisions, a next training iteration can begin.

Figure 6A:
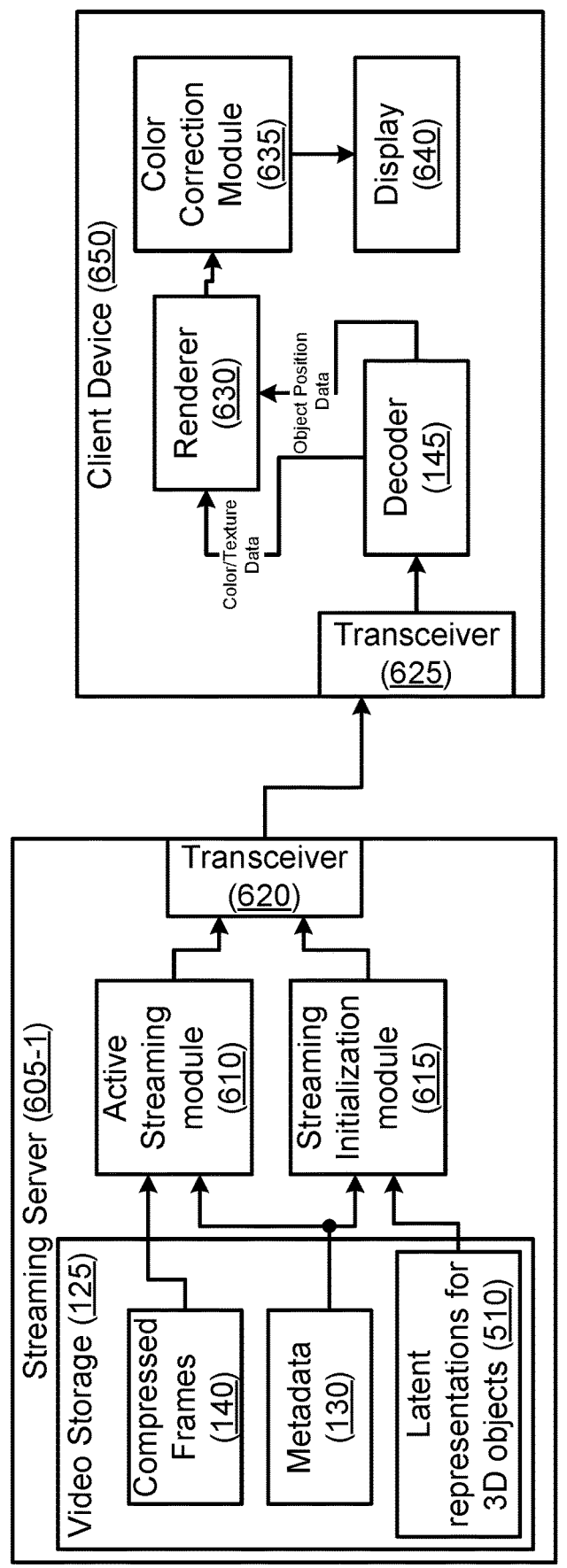
FIG. 6A illustrates a block diagram of a signal flow for streaming a video and rendering the video on a client device.

In an example implementation, streaming and/or downloading a video can include communicating initialization data for use by a requesting client device (e.g., for decompressing a compressed frame) before communicating or streaming the compressed frames of the video. FIG. 6A illustrates a block diagram of a signal flow for streaming a video and rendering the video on a client device. As shown in FIG. 6A, a streaming server 605-1 includes the video storage 125, an active streaming module 610, a streaming initialization module 615, and a transceiver 620. The video storage 125 includes the compressed frames 140, the metadata 130 and the latent representations for 3D objects 510. The streaming server 605-1 can be communicatively coupled to a client device 650 via the transceiver 625. As shown in FIG. 6A, the client device 650 includes a transceiver 625, the decoder 145, a renderer 630, a color correction module 635, and a display 640.

The active streaming module 610 can be configured to stream frames of a selected video to a requesting client device (e.g., client device 650). The active streaming module 610 can receive a request for a next frame from the client device 650. The active streaming module 610 can then select the next frame from the compressed frames 140 and select corresponding metadata from the metadata 130. In an example implementation, the selected next frame can be a plurality of compressed frames and the selected metadata can be a plurality of corresponding metadata elements. For example, the plurality of compressed frames can be a number of frames bound by (and possibly including) a previous (e.g., temporally before the frames) key frame and a future (e.g., temporally after the frames) key frame.

The active streaming module 610 can then communicate the selected next frame (or frames) and the selected metadata (or metadata elements) to the transceiver 620. The transceiver 620 can then build a data packet or data packets including the selected next frame and the selected metadata, assign an address of the client device 650 to the data packet and communicate the data packet to the client device 650.

The streaming initialization module 615 can be configured to select data associated with a streaming video in response to a first request for the video by the client device 650. For example, a user of the client device 650 can download the video for a future play back and/or to begin a streaming play back. The streaming initialization module 615 can select the stored 3D objects 135 for the video as a set of the latent representations for 3D objects 510 and metadata corresponding to the video from the metadata 130. The streaming initialization module 615 can then communicate the selected the stored 3D objects 135 and the selected metadata to the transceiver 620. The transceiver 620 can then build a data packet including the selected stored 3D objects 135 and the selected metadata, assign an address of the client device 650 to the data packet and communicate the data packet to the client device 650. In an example implementation, the transceiver 620 can build more than one data packet.

The client device 650 receives the data packet including the stored 3D objects 135 and the metadata via the transceiver 625. The transceiver 625 communicates the stored 3D objects 135 and the metadata to the decoder 145. The decoder 145 can be configured to store the stored 3D objects 135 and the metadata in relation to the requested video. The client device 650 then receives the data packet(s) including the selected next frame and the selected metadata via the transceiver 625. The selected next frame can be a first frame on initial play back. The transceiver 625 communicates the selected next frame and the selected metadata to the decoder 145.

The decoder 145 then decodes (as described in more detail above) the next frame using the stored 3D objects 135 and the metadata associated with the next frame. In an example implementation, the decoder 145 can be implemented as or in graphics card and/or chip (e.g., an ASIC on a computer mother board) including a graphics processing unit (GPU), configured to remove load from the central processing unit (CPU) of the device 650. The GPU can be configured to process large blocks of video data in parallel. The GPU can be configured to process (e.g., decompress) mesh data and generate pixel data from mesh data. The decoder communicates texture data and color data to the renderer 630.

In a 3D rendering system, Cartesian coordinate systems (x- (left/right), y- (up/down) and z-axis (near/far)) are typically used. The Cartesian coordinate system provides a precise mathematical method to locate and represent objects in a space. To simplify, the image of the frame can be considered the space that objects will be located. The space can be oriented based on a camera position. For example, the camera can be placed at the origin and looking straight into the z-axis. Therefore, translational movement (with respect to the camera position) is z-forward/backward, y-up/down, and x-left right. Objects are then projected into the space based on their coordinates with respect to the origin of the space and any camera repositioning. Noting that an object and/or the camera can move from frame-to-frame.

The renderer 630 can be configured to render the texture data and color data for display. Rendering, or drawing, can be implemented in a graphics pipeline in a geometry stage and a rendering stage. The GPU can be configured to process both the geometry stage and the rendering stage. The geometry stage, performed by the CPU or GPU, is configured to process all polygon activity and convert 3D spatial data into pixels. Geometry stage processes can include, but is not limited to, scene (e.g., background) geometry generation, object movement based on camera movement, object movement, object transformation (e.g., rotating, translating, and/or scaling), object visibility (e.g., occlusion and culling) and polygon (e.g., triangle) generation.

The rendering stage, performed by a 3D hardware accelerator of the GPU, is configured to manage the memory and pixel activity and to process pixels for painting to the display 640. Rendering stage processes can include, but is not limited to, shading, texturing, depth buffering and displaying.

Rendering the texture data and color data for display can include using a 3D shader (e.g., a vertex shader, a geometry shader, and/or the like) to draw the mesh associated with frame. The shader can be configured to generate primitives. The shader can be configured to transform each vertex's 3D position and texture in the mesh to the 2D coordinate (e.g., primitives) at which it appears on a display (e.g., display 640). Rendering the texture data and color data for display can also include performing rasterization. Rasterization can include using assigning pixel (e.g., color) values to the primitives based on the texture data and the color data.

As discussed above, the geometry stage includes building a 3D mesh in a 2D coordinate system and the rendering stage includes adding color and texture to the mesh. Therefore, the output of decoder 145 can include object position data and color/texture data. Accordingly, the compressed frames 140 can include compressed object position data and compressed color/texture data. The compressed object position data and the compressed color/texture data can be based on a displacement from a previous or future frame, based on camera translational movement data, based on absolute data (e.g., x, y, z coordinate, RGB values, and/or the like), and/or a combination or variation thereof. Therefore, encoder 105 can encode the scene of a frame to generate compressed frames 140 including data with this compressed object position data and the compressed color/texture data.

The data associated with the rendered next frame can be communicated to the color correction module 635. The color correction module 635 can be configured to apply color correction to the data associated with the rendered next frame. Color correction can include compensating for color differences between frames, compensating for color differences between multiple views of the same scene, correcting for object distortions (warping), correcting for object border distortion, and/or the like.

The color correction module 635 can communicate the color corrected frame to the display 640. The display 640 can be configured to display the frame as a sequence of frames representing the requested video. In an example implementation, the display 640 includes and/or has an associated buffer and/or queue. The buffer and/or queue can be a first in/first out the buffer and/or queue. Accordingly, the color correction module 635 can communicate the color corrected frame to the buffer and/or queue. The display 640 includes a component configured to select a next frame from the buffer and/or queue.

Figure 6B:
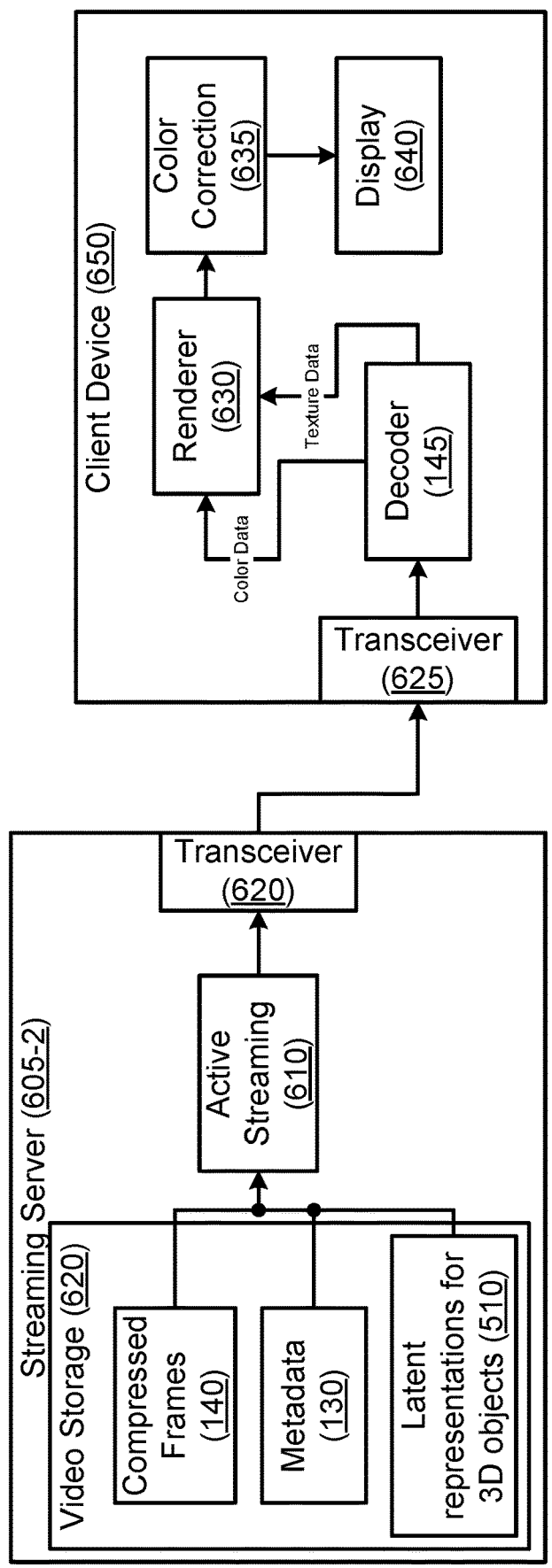
FIG. 6B illustrates a block diagram of another signal flow for streaming a video and rendering the video on a client device.

In an example implementation, streaming and/or downloading a video can include communicating data for use by a requesting client device (e.g., for decompressing a compressed frame) in parallel (e.g., at approximately the same time) with communicating or streaming the compressed frames of the video. FIG. 6B illustrates a block diagram of another signal flow for streaming a video and rendering the video on a client device. As shown in FIG. 6B, a streaming server 605-2 includes the video storage 125, the active streaming module 610, and a transceiver 620.

In the example implementation shown in FIG. 6B, the active streaming module 610 is further configured to select at least one 3D object of interest used in compressing the selected next frame as at least one of the stored 3D objects 135 from the latent representations for 3D objects 510. The active streaming module 610 communicates the at least one of the stored 3D objects 135 together with the selected next frame and the selected metadata to the transceiver 620. The transceiver 620 can then build a data packet including the selected next frame, the selected metadata and the at least one of the stored 3D objects 135, assign an address of the client device 650 to the data packet and communicate the data packet to the client device 650.

The client device 650 then receives the data packet(s) including the selected next frame, the selected metadata and the at least one of the stored 3D objects 135 via the transceiver 625. The transceiver 625 communicates the selected next frame, the selected metadata and the at least one of the stored 3D objects 135 to the decoder 145. The decoder 145 can be further configured to add the at least one of the stored 3D objects 135 to the stored 3D objects 135 associated with the requested video and/or use the at least one of the stored 3D objects 135 to initialize a stored 3D objects 135 for the requested video.

Further, although the color prediction by geometric proxies techniques described herein may be most advantageous when encoding/decoding 3D objects having a dynamic non-linear and/or random motion from frame-to-frame in a video, sometimes referred to herein as dynamic 3D objects, other 3D objects or non-dynamic 3D objects can be advantageously encoded/decoded using color prediction by geometric proxy techniques as well.

For example, 3D objects that appear to be moving from frame-to-frame due to camera or scene translation can be encoded/decoded using color prediction by geometric proxy. In this example, a stationary 3D object can appear to be moving from frame-to-frame because a camera capturing the scene is moving (e.g., in a predictable manner and/or direction). For example, 3D objects that appear to be moving in a predictable fashion within a scene can be encoded/decoded using color prediction by geometric proxy. In this example, a 3D object (e.g., a vehicle i.e., a train, an automobile or a plane) can be moving in a predictable manner (e.g., at a constant speed and/or direction) from frame-to-frame. These objects are sometimes referred to herein as translational 3D objects. As another example, 3D objects that appear not to be moving within a scene can be encoded/decoded using color prediction by geometric proxy. In this example, a stationary or fixed 3D object (e.g., a background of the scene, furniture at a fixed position within the scene or a slowly moving object in the distance) can be appear stationary (e.g., without any camera or scene translation) from frame-to-frame. These objects are sometimes referred to herein as fixed or background 3D objects.

The other types of 3D objects exemplified above can be advantageously encoded/decoded using color prediction by geometric proxy techniques for any number of reasons. For example (this is not intended to be an exhaustive list), at least one position (e.g., a position in a frame) of a translational 3D object, a fixed 3D object and/or background 3D object can be communicated from a streaming server (e.g., streaming server 605-1, 605-2) to a client device (e.g., client device 650) to be used in a renderer and/or rendering operation, a number of frames between key frames can be increased because of the existence of the geometric proxies (e.g., the stored 3D objects 135), a Z-order layering technique can be used for both dynamic 3D objects and non-dynamic 3D objects, a lost (e.g., not retransmitted) frame could be recreated using temporally earlier and temporally later frames (e.g., stored in a queue before being rendered) and a geometric proxy, a 3D object that appears and disappears between key frames can be encoded/decoded using the geometric proxy and/or an out of frame background camera or scene translation can be encoded/decoded using the geometric proxy.

Accordingly, metadata 20 described above can be used in renderer 630 to more efficiently render translational 3D objects, fixed 3D objects and/or background 3D objects. In an example implementation, a first object can be identified as a background 3D object. The metadata 20 can identify the first object as, for example, one of the stored 3D objects 135. The metadata 20 can also identify an origin coordinate (e.g., $x_0, y_0, z_0$) of the first object (e.g., as the background for the frame) as a position attribute of one of the points in the mesh representing the first object.

Further, at least one second object can be identified as a translational 3D object and/or a fixed 3D object. The metadata 20 can identify the at least one second object as, for example, one of the stored 3D objects 135. The metadata 20 can also identify a position (e.g., $x_1, y_1, z_1$) of the at least one second object as a position attribute of one of the points in the mesh representing the at least one second object. The identified position of the at least one second object can be relative to another object. The relative position of the at least one second object can vary (e.g., as a translational 3D object) from frame-to-frame. The relative position of the at least one second object can be fixed (e.g., as a fixed 3D object) from frame-to-frame.

For example, the identified position of the at least one second object can be relative to the identified origin coordinate of the background for the frame (e.g., the first object). Using a relative position for the at least one second object can allow for six degrees of freedom when positioning the at least one second object relative to the background for the frame. In other words, the at least one second object can have translational movement (e.g., forward/backward, up/down and/or left right) as well as rotational movement (e.g., pitch, roll and/or yaw) when positioning the at least one second object relative to the background for the frame.

As discussed above, the first object can be identified as a background 3D object and can be one of the stored 3D objects 135. Further, the at least one second object can be identified as a translational 3D object and/or a fixed 3D object which can also be one of the stored 3D objects 135. Therefore, the first object and/or the at least one second object can be encoded (implementing a neural network) by an autoencoder into a latent representation of the corresponding stored 3D objects 135 (as discussed in more detail above). The latent representation (e.g., as one or more of the latent representations for 3D objects 510) and information (e.g., metadata) related to a structure of the neural network can be communicated from the streaming server 605-1, 605-2 to the client 650. The client 650 can reconstruct the one or more corresponding stored 3D objects 135 using a decoder (implementing the neural network) of the autoencoder (as discussed in more detail above).

Figure 13:
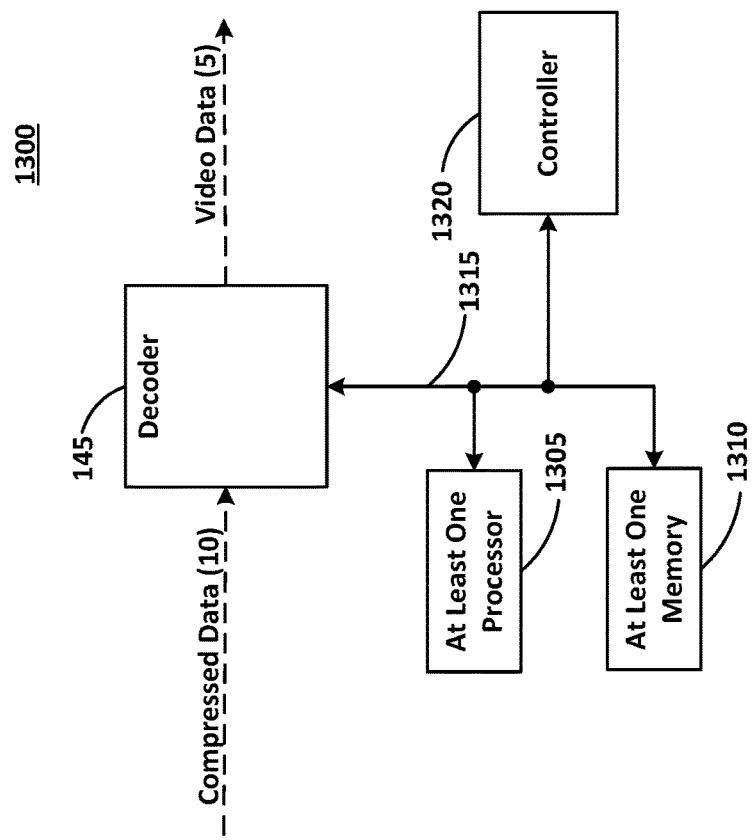
FIG. 13 illustrates a video decoder system according to at least one example embodiment.

FIGS. 7-11 are flowcharts of methods according to example embodiments. The steps described with regard to FIGS. 7-11 may be performed due to the execution of software code stored in a memory (e.g., at least one memory 1210, 1310) associated with an apparatus (e.g., as shown in FIGS. 12 and 13) and executed by at least one processor (e.g., at least one processor 1205, 1305) associated with the apparatus.

However, alternative embodiments are contemplated such as a system embodied as a special purpose processor. The special purpose processor can be a graphics processing unit (GPU). A GPU can be a component of a graphics card. The graphics card can also include video memory, random access memory digital-to-analogue converter (RAMDAC) and driver software. The video memory can be a frame buffer that stores digital data representing the image or scene of a frame. A RAMDAC can be configured to read the contents of the video memory, convert the content into an analogue RGB signal and sends analog signal to a display or monitor. The driver software can be the software code stored in the memory referred to above (e.g., at least one memory 1210, 1310). The software code can be configured to implement the steps described below (and/or the components, modules and signal flows described above).

Although the steps described below are described as being executed by a processor and/or a special purpose processor, the steps are not necessarily executed by a same processor. In other words, at least one processor and/or at least one special purpose processor may execute the steps described below with regard to FIGS. 7-11.

Figure 7:
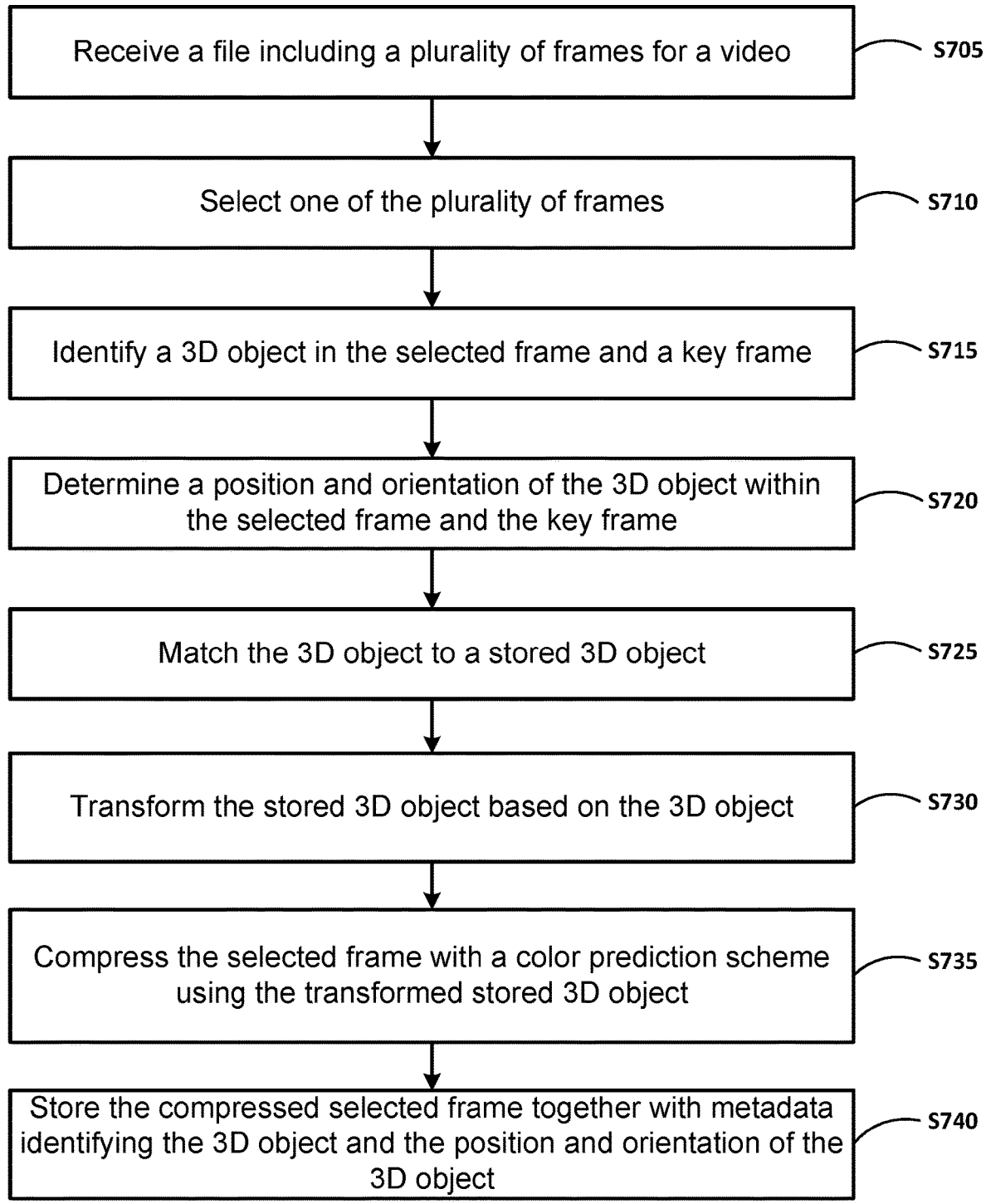
FIG. 7 illustrates a block diagram of a method for compressing a frame of a video according to at least one example embodiment.

FIG. 7 illustrates a block diagram of a method for compressing a frame of a video according to at least one example embodiment. As shown in FIG. 7, in step S705 a file including a plurality of frames for a video is received. For example, the file can be saved or transferred to a server (e.g., a streaming server). The file can include a video. The video can be a CGI 3D movie. The file can include a plurality of 3D objects of interest (e.g., characters in the 3D movie).

In an example implementation each of the plurality of 3D objects of interest can be defined by a triangular mesh. The triangular mesh can be a collection of points connected by triangular faces. Each point can store various attributes. For example, the attributes can include positions, colors, texture coordinates, and the like of each point. The mesh for each of the plurality of 3D objects of interest can have a same number of points each with the same attributes. Therefore, the mesh for each of the plurality of 3D objects of interest can be approximately the same size (e.g., number of bits) when stored in a memory.

In step S710 one of the plurality of frames is selected. For example, each of the plurality of frames can be targeted for compression. The plurality of frames can be compressed in a temporal sequence. Therefore, in a initial step a first frame temporally is selected. Then a next frame sequentially can be selected.

In step S715 a 3D object is identified in the selected frame and a key frame. The identified 3D object can be a dynamic 3D object, a non-dynamic 3D object, a fixed 3D object, a background 3D object, and/or the like. For example, a machine vision, a computer vision and/or computer image recognition technique can be used to identify and locate the 3D object.

In an example implementation, a computer image recognition technique based on training (machine-learning) a convolutional neural network using a plurality of known images can be used to identify the 3D object. For example, a block, a plurality of blocks and/or a patch is selected from and/or identified in the selected frame. The trained convolutional neural network can operate on the selected block, plurality of blocks and/or patch. The result can be tested (e.g., error tested, loss tested, divergence tested, and/or the like). If the test results in a value below (or alternatively, above depending on the type of test) a threshold value, the selected block, plurality of blocks and/or patch can be identified as a 3D object.

In an example implementation, the frames of the video can include tags indicating a previously identified 3D object of interest is included in the frame. The tag can include the identity and location of the 3D object. For example, the video can be generated using a computer generated image (CGI) tool (e.g., a computer animated movie). Computer generated characters can be identified and tagged in each frame. Further, a model for each of the identified 3D objects of interest (e.g., the identified characters) can be stored as stored 3D objects 135.

In an example implementation, the 3D object can be defined by a triangular mesh. The triangular mesh can be a collection of points connected by triangular faces. Each point can store various attributes. For example, the attributes can include positions, colors, texture coordinates, and the like of each point. The attributes can include and/or indicate (e.g., a plurality of the attributes can indicate) an orientation of a corresponding 3D object and/or a position of the corresponding 3D object in the selected frame.

Therefore, in an example implementation, mesh attributes of the 3D object can be sufficient to identify and locate the 3D object. A model including mesh attributes for a plurality of 3D objects of interest can be stored as stored 3D objects 135. The model can be standardized. For example, a model for a man, a woman, an adolescent, a child, or more generally a human or portion of a human (e.g., a body, a head, a hand, and/or the like can be stored as stored 3D objects 135. For example, a model for a dog, a cat, a deer, or more generally a four legged animal or portion of a four legged animal (e.g., a body, a head, a leg, and/or the like can be stored as stored 3D objects 135. Attributes of the model can then be used to search the frame for a 3D object having similar attributes.

In step S720 a position and orientation of the 3D object within the selected frame and the key frame is determined. For example, 3D object can be defined by a mesh with a plurality of points each having at least one attribute. The position of the 3D object can be a position of the 3D object within the frame. Therefore, the position of the 3D object within the frame can be based on a 3D Cartesian coordinate system for the frame. For example, at least one of the points of the mesh can be located at an x, y, z position within the frame. The orientation of the 3D object can be based on position coordinate attributes for each point in the mesh defining the 3D object. If the 3D object is a character in the move, the orientation of the 3D object can be a pose of the character in the frame and/or key frame.

In step S725 the 3D object is matched to a stored 3D object. For example, the 3D object can be matched to one of the 3D objects of interest (e.g., the stored 3D objects 135). In an example implementation, the identity of the 3D object as generated by the computer image recognition technique can be used to search the stored 3D objects 135. In an example implementation, the tag of a 3D object found in a frame can be matched to a tag of one of the stored 3D objects 135. In an example implementation, the model of one of the stored 3D objects 135 having similar attributes to the 3D object can be identified as a match. The matched stored 3D object can be used as a geometric proxy.

In step S730 the stored 3D object is transformed based on the 3D object. For example, the stored 3D object can be deformed based on the 3D object. The stored 3D object can be resized based on the 3D object. The stored 3D object can be oriented based on the 3D object. The stored 3D object can be rotated based on the 3D object. The stored 3D object can be translated based on the 3D object. Transforming the stored 3D object can cause the stored 3D object (if rendered side-by-side on a display with the 3D object) to appear substantially similar (e.g., posed) to the 3D object. Noting that the stored 3D object can be defined by a different mesh and can have different color attributes as the 3D object.

In an example implementation, a mesh corresponding to the stored 3D object can be rotated and translated about and along the x, y, and z axes to align with an orientation of the 3D object. The matched one of the stored 3D objects 135 associated with the frame and the key frame can be transformed. Therefore, the stored 3D object can be used to generate a first 3D object proxy based on the stored 3D object for the 3D object associated with the frame. Further, the stored 3D object can be used to generate a second 3D object proxy based on the stored 3D object for the 3D object associated with the key frame. Accordingly, the first 3D object proxy can be transformed based on the 3D object identified in the frame and the second 3D object proxy can be transformed based on the 3D object identified in the key frame.

In step S735 the selected frame is compressed with a color prediction scheme using the transformed stored 3D object. For example, points in the mesh defining the transformed stored 3D object can be matched to points of a corresponding (e.g., the same) 3D object located in a nearby (temporally), previously encoded, key frame. Then, the prediction technique can use the matched points of the corresponding 3D object to select or predict a pixel/block/patch in the key frame for use in calculating residuals (e.g., color displacement in relation to the key frame) for the 3D object in the selected frame.

In an example implementation, the transformed first 3D object proxy can be wrapped (with a color and/or a texture) corresponding to the 3D object identified in the frame and the transformed second 3D object proxy can be can be wrapped (with a color and/or a texture) corresponding to the 3D object identified in the key frame. Mapping color attributes from the 3D object identified in the frame 110 to the transformed first 3D object proxy can include converting the 3D object from a 3D space (e.g., an XYZ space) to a 2D space (e.g., a UV space) and or converting the 3D object identified in the frame 110 from a 2D space (e.g., a UV space) to a 3D space (e.g., an XYZ space). Residuals for the 3D object can be generated by subtracting color attributes of a point in the mesh representation of the first 3D object proxy from color attributes of a corresponding point (e.g., having the same point identification or being in the same position in the mesh sequence) in the mesh representation of the second 3D object proxy.

In an example implementation, two or more 3D objects are identified in the selected frame. Each of the identified 3D objects is predicted using the aforementioned prediction technique. The remainder of the frame uses a standard prediction technique to generate residuals. Compressing the selected frame can include performing a series of encoding processes on the residuals. For example, the residuals can be transformed, quantized and entropy encoded.

In addition, the prediction scheme can generate metadata associated with the selected frame. The metadata can include data associated with at least one 3D object located in the selected frame that has been predicted using one of the 3D objects of interest (e.g., the stored 3D objects 135). The metadata can include attributes (e.g., mesh point attributes) associated with a location and/or an orientation of the 3D object in the selected frame and the key frame.

In step S740 the compressed selected frame is stored together with metadata identifying the 3D object and the position and orientation of the 3D object. For example, the compressed selected frame and metadata can be stored in a memory associated with a streaming server. The compressed selected frame and metadata can be stored in relation to a plurality of compressed frames corresponding to the video (or a portion thereof).

Figure 8:
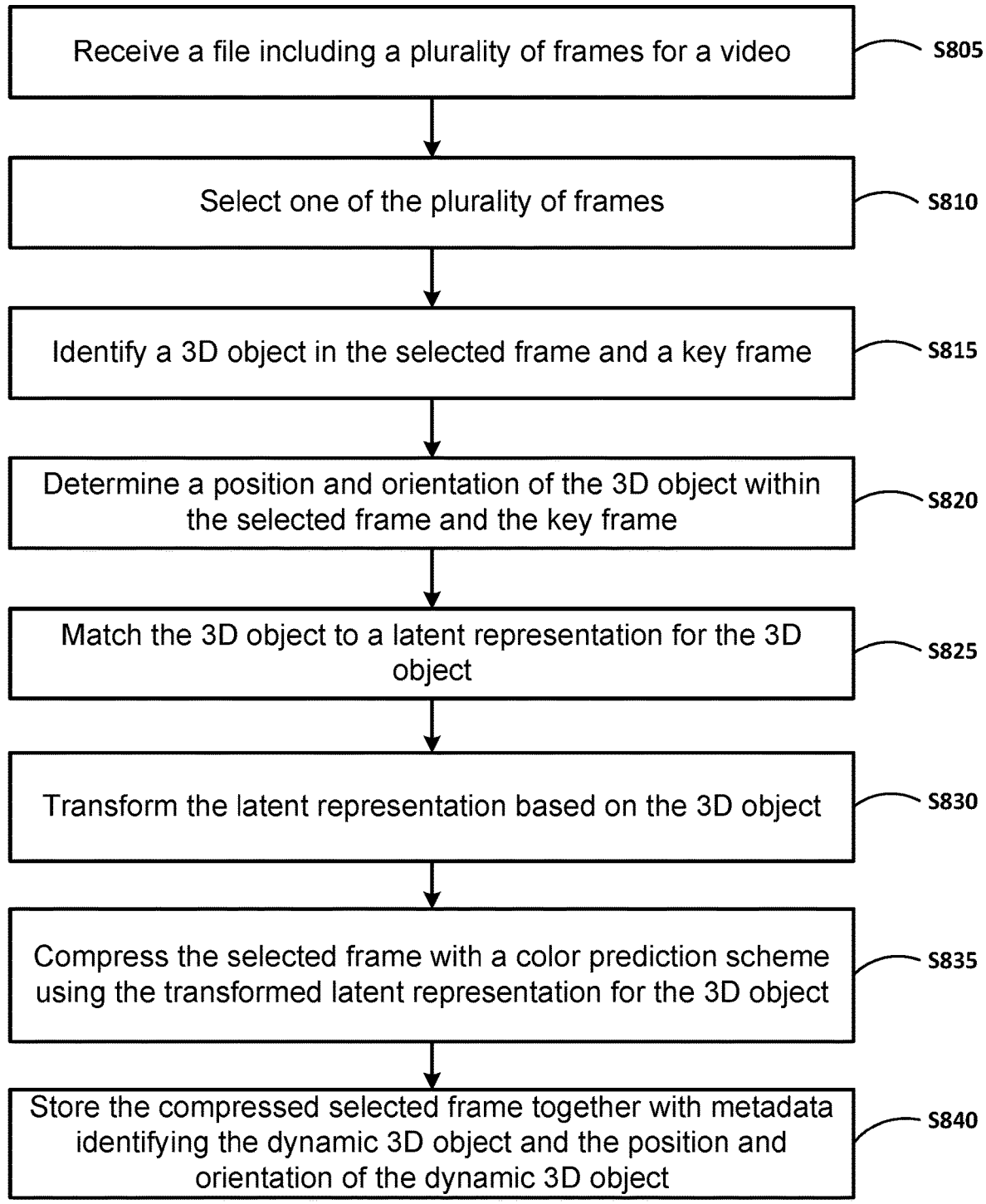
FIG. 8 illustrates a block diagram of another method for compressing a frame of a video according to at least one example embodiment.

FIG. 8 illustrates a block diagram of another method for compressing a frame of a video according to at least one example embodiment. As shown in FIG. 8, in step S805 a file including a plurality of frames for a video is received. For example, the file can be saved or transferred to a server (e.g., a streaming server). The file can include a video. The video can be a CGI 3D movie. The file can include a plurality of 3D objects of interest (e.g., characters in the 3D movie).

In an example implementation each of the plurality of 3D objects of interest can be defined by a triangular mesh. The triangular mesh can be a collection of points connected by triangular faces. Each point can store various attributes. For example, the attributes can include positions, colors, texture coordinates, and the like of each point. The mesh for each of the plurality of 3D objects of interest can have a same number of points each with the same attributes. Therefore, the mesh for each of the plurality of 3D objects of interest can be approximately the same size (e.g., number of bits) when stored in a memory.

In an example implementation, the mesh for each of the plurality of 3D objects of interest can be compressed (e.g., compressed using the technique describe above with regard to FIG. 5A). For example, the mesh for each of the plurality of 3D objects of interest can be compressed using generative modeling techniques (e.g., using a neural network, convolutional neural network, a VAE, and/or the like). The mesh for each of the plurality of 3D objects of interest can be compressed using a neural network encoder having a convolutional neural network with elements selected and trained based on a machine trained generative modeling technique configured to generate a reduced number of variables associated with the mesh attributes and position for each 3D object. The generated reduced number of variables associated with the mesh attributes and position for a 3D object is sometimes called a compact latent representation for the 3D object.

In step S810 one of the plurality of frames is selected. For example, each of the plurality of frames can be targeted for compression. The plurality of frames can be compressed in a temporal sequence. Therefore, in a initial step a first frame temporally is selected. Then a next frame sequentially can be selected.

In step S815 a 3D object is identified in the selected frame and a key frame. The identified 3D object can be a dynamic 3D object, a non-dynamic 3D object, a stationary 3D object, a background 3D object, and/or the like. For example, a machine vision, a computer vision and/or computer image recognition technique can be used to identify and locate the 3D object.

In an example implementation, a computer image recognition technique based on training (machine-learning) a convolutional neural network using a plurality of known images can be used to identify the 3D object. For example, a block, a plurality of blocks and/or a patch is selected from and/or identified in the selected frame. The trained convolutional neural network can operate on the selected block, plurality of blocks and/or patch. The result can be tested (e.g., error tested, loss tested, divergence tested, and/or the like). If the test results in a value below (or alternatively, above depending on the type of test) a threshold value, the selected block, plurality of blocks and/or patch can be identified as a 3D object.

In an example implementation, the frames of the video can include tags indicating a previously identified 3D object of interest is included in the frame. The tag can include the identity and location of the 3D object. For example, the video can be generated using a computer generated image (CGI) tool (e.g., a computer animated movie). Computer generated characters can be identified and tagged in each frame. Further, a model for each of the identified 3D objects of interest (e.g., the identified characters) can be stored as stored 3D objects 135.

In an example implementation, the 3D object can be defined by a triangular mesh. The triangular mesh can be a collection of points connected by triangular faces. Each point can store various attributes. For example, the attributes can include positions, colors, texture coordinates, and the like of each point. The attributes can include and/or indicate (e.g., a plurality of the attributes can indicate) an orientation of a corresponding 3D object and/or a position of the corresponding 3D object in the selected frame.

Therefore, in an example implementation, mesh attributes of the 3D object can be sufficient to identify and locate the 3D object. A model including mesh attributes for a plurality of 3D objects of interest can be stored as stored 3D objects 135. The model can be standardized. For example, a model for a man, a woman, an adolescent, a child, or more generally a human or portion of a human (e.g., a body, a head, a hand, and/or the like can be stored as stored 3D objects 135. For example, a model for a dog, a cat, a deer, or more generally a four legged animal or portion of a four legged animal (e.g., a body, a head, a leg, and/or the like can be stored as stored 3D objects 135. Attributes of the model can then be used to search the frame for a 3D object having similar attributes.

In step S820 a position and orientation of the 3D object within the selected frame and the key frame is determined. For example, 3D object can be defined by a mesh with a plurality of points each having at least one attribute. The position of the 3D object can be a position of the 3D object within the frame. Therefore, the position of the 3D object within the frame can be based on an 3D Cartesian coordinate system for the frame. For example, at least one of the points of the mesh can be located at an x, y, z position within the frame. The orientation of the 3D object can be based on position coordinate attributes for each point in the mesh defining the 3D object. If the 3D object is a character in the move, the orientation of the 3D object can be a pose of the character in the frame and/or key frame.

In step S825 the 3D object is matched to a latent representation for the 3D object. For example, the 3D object can be matched to one of the 3D objects of interest (e.g., the stored 3D objects 135). Then, the matched 3D object can be encoded into a latent representation for the 3D object as described above. For example, the 3D object can be matched to one of the 3D objects of interest (e.g., the stored latent representations for 3D objects 510). In an example implementation, the identity of the 3D object as generated by the computer image recognition technique can be used to search the stored latent representations for 3D objects 510. In an example implementation, the tag of a 3D object found in a frame can be matched to a tag of one of the stored latent representations for 3D objects 510. In an example implementation, the model of one of the stored latent representations for 3D objects 510 having similar attributes to compressed mesh attributes of the 3D object can be identified as a match.

In step S830 the latent representation is transformed based on the 3D object. For example, the stored 3D object can be deformed based on the 3D object. The stored 3D object can be resized based on the 3D object. The stored 3D object can be oriented based on the 3D object. The stored 3D object can be rotated based on the 3D object. The stored 3D object can be translated based on the 3D object. Transforming the stored 3D object can cause the stored 3D object (if rendered side-by-side on a display with the 3D object) to appear substantially similar to the 3D object. Noting that the stored 3D object can be defined by a different mesh and can have different color attributes as the 3D object.

In an example implementation, a coordinate of each point of the latent representation of the 3D object can be rotated and translated about and along the x, y, and z axes to align with an orientation of the 3D object. The matched latent representation of the 3D object associated with the frame and the key frame can be transformed. Therefore, a latent representation of the 3D object can be generated as a a first 3D object proxy based on the stored 3D object for the 3D object associated with the frame. Further, a latent representation of the 3D object can be generated as a second 3D object proxy based on the stored 3D object for the 3D object associated with the key frame. Accordingly, the first 3D object proxy can be transformed based on the 3D object identified in the frame and the second 3D object proxy can be transformed based on the 3D object identified in the key frame.

In an example implementation, the stored 3D object is stored as a compact latent representation based on the 3D object. Therefore, prior to transforming the stored 3D object, the stored 3D object can be regenerated (e.g., decompressed using the technique describe above with regard to FIG. 5B) using the compact latent representation based on the 3D object. For example, the variables in the compact latent space for the stored 3D object can be input to a neural network decoder to regenerate the points of the mesh defining the stored 3D object and the position coordinates for each point of the mesh.

In step S835 the selected frame is compressed with a color prediction scheme using the transformed stored 3D object having a compact latent representation for the 3D object. As discussed above, the transformed stored 3D object having a compact latent representation for the 3D object can be a transformed regenerated stored 3D object. For example, points in the mesh defining the transformed regenerated stored 3D object can be matched to points of a corresponding (e.g., the same) 3D object located in a nearby (temporally), previously encoded, key frame. Then, the prediction technique can use the matched points of the corresponding 3D object to select or predict a pixel/block/patch in the key frame for use in calculating residuals (e.g., color displacement in relation to the key frame) for the 3D object in the selected frame.

In an example implementation, the transformed first 3D object proxy can be wrapped (with a color and/or a texture) corresponding to the 3D object identified in the frame and the transformed second 3D object proxy can be can be wrapped (with a color and/or a texture) corresponding to the 3D object identified in the key frame. Mapping color attributes from the 3D object identified in the frame 110 to the transformed first 3D object proxy can include converting the 3D object from a 3D space (e.g., an XYZ space) to a 2D space (e.g., a UV space) and or converting the 3D object identified in the frame from a 2D space (e.g., a UV space) to a 3D space (e.g., an XYZ space). In an example implementation, residuals for the 3D object can be generated by subtracting color attributes of a point in the latent representation of the first 3D object proxy from color attributes of a corresponding point (e.g., having the same coordinate or being in a same position) in the latent representation of the second 3D object proxy.

In an example implementation, the latent representation for the transformed wrapped first 3D object proxy and the latent representation for the transformed wrapped second 3D object proxy can be decoded. Decoding a latent representation for a 3D object can regenerate a mesh representation including the color attributes for the 3D object as described above. Residuals for the 3D object can be generated by subtracting color attributes of a point in the regenerated mesh representation of the first 3D object proxy from color attributes of a corresponding point (e.g., having the same point identification or being in the same position in the mesh sequence) in the regenerated mesh representation of the second 3D object proxy.

In an example implementation, two or more 3D objects are identified in the selected frame. Each of the identified 3D objects is predicted using the aforementioned prediction technique. The remainder of the frame uses a standard prediction technique to generate residuals. Compressing the selected frame can include performing a series of encoding processes on the residuals. For example, the residuals can be transformed, quantized and entropy encoded.

In addition, the prediction scheme can generate metadata associated with the selected frame. The metadata can include data associated with at least one 3D object located in the selected frame that has been predicted using one of the 3D objects of interest (e.g., the stored 3D objects 135). The metadata can include attributes (e.g., mesh point attributes) associated with a location and/or an orientation of the 3D object in the selected frame. The metadata can include information associated with a neural network for the autoencoder used to generate a latent representation of a 3D object (e.g., encode) and to regenerate a mesh representation including the color attributes for the 3D object (e.g., decode).

In step S840 the compressed selected frame is stored together with metadata identifying the 3D object and the position and orientation of the 3D object. For example, the compressed selected frame and metadata can be stored in a memory associated with a streaming server. The compressed selected frame and metadata can be stored in relation to a plurality of compressed frames corresponding to the video (or a portion thereof).

Figure 9:
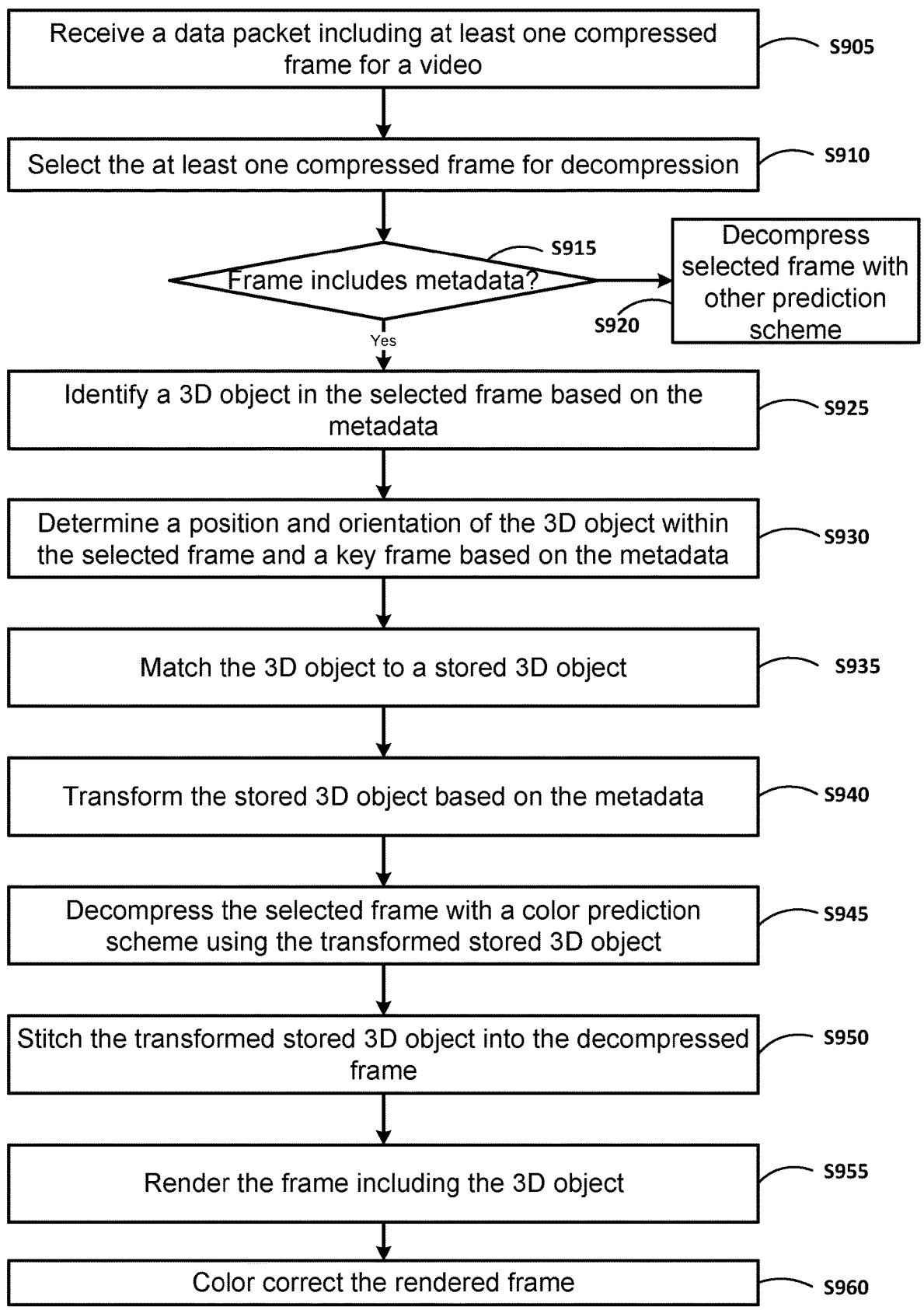
FIG. 9 illustrates a block diagram of a method for decompressing and rendering a frame of a video according to at least one example embodiment.

FIG. 9 illustrates a block diagram of a method for decompressing and rendering a frame of a video according to at least one example embodiment. As shown in FIG. 9, in step S905 a data packet including at least one compressed frame for a video is received. For example, a client device can request a next frame for a video from a streaming server. In response to the request, the streaming server can select the next frame (or frames), determine if the selected next frame (or frames) has associated metadata and selects the associated metadata. The streaming server can generate a data packet (or data packets) including the selected next frame (or frames) and the selected associated metadata and communicate the data packet (or data packets) to the requesting client device.

In step S910 the at least one frame is selected for decompression. For example, the frame can be selected from the received data packet (or data packets). In step S915 whether or not the frame includes metadata is determined. In response to determining the frame includes metadata, processing continues to step S925. Otherwise, processing continues to step S920 and the selected frame is decoded with some other prediction scheme (e.g., a prediction scheme that is not based on using a 3D object as a geometric proxy).

For example, a header associated with the data packet for the selected frame can be configured to contain the metadata when the data packet is communicated from the streaming server to the client. Accordingly, the header associated with the data packet for the selected frame can be read (e.g., by transceiver 625) and communicated with the selected frame to a decoder (e.g., decoder 145). Therefore, determining the selected frame includes metadata can include determining that the metadata was communicated with the selected frame. Alternatively, determining the selected frame includes metadata can include determining that the metadata is stored (e.g., in the decoder) in association with the selected frame.

In step S925 a 3D object in the selected frame is identified based on the metadata. For example, the metadata can include data associated with at least one 3D object located in the selected frame that has been predicted using a 3D object as a geometric proxy (e.g., at least one of the stored 3D objects 135). The metadata can include information identifying the 3D object used as the geometric proxy.

In step S930 a position and orientation of the 3D object within the selected frame and a key frame is determined based on the metadata. For example, the metadata can include attributes (e.g., mesh point attributes) associated with a location and/or an orientation of the 3D object in the selected frame and the key frame.

In step S935 the 3D object is matched to a stored 3D object. For example, the metadata can include information identifying that the 3D object has a corresponding stored 3D object. In an example implementation, the metadata includes a unique ID or tag that can be used to search the stored 3D objects 135 for the 3D object. If the unique ID or tag is found in the stored 3D objects 135, the corresponding one of the stored 3D objects 135 is a match for the 3D object.

In step S940 the stored 3D object is transformed based on the metadata. For example, the metadata can include information identifying that the 3D object has a corresponding stored 3D object and information related to the transformation performed on the stored 3D object during an encoding process. The information related to the transformation performed on the stored 3D object during an encoding process can be used to perform the same transformation of the stored 3D object that was performed on the stored 3D object to encode the selected frame.

The stored 3D object can be deformed based on the information related to the transformation performed on the stored 3D object during the encoding process. The stored 3D object can be resized based on the information related to the transformation performed on the stored 3D object during the encoding process. The stored 3D object can be oriented based on the information related to the transformation performed on the stored 3D object during the encoding process. The stored 3D object can be rotated based on the information related to the transformation performed on the stored 3D object during the encoding process. The stored 3D object can be translated based on the information related to the transformation performed on the stored 3D object during the encoding process. Transforming the stored 3D object can cause the stored 3D object (if rendered side-by-side on a display with the 3D object) to appear substantially similar to the 3D object as the 3D object appeared in the selected frame prior to compressing the selected frame.

In an example implementation, the matched one of the stored 3D objects associated with the frame and the key frame can be transformed. Therefore, the stored 3D object can be used to generate a first 3D object proxy based on the stored 3D object for the 3D object associated with the frame. Further, the stored 3D object can be used to generate a second 3D object proxy based on the stored 3D object for the 3D object associated with the key frame. Accordingly, the first 3D object proxy can be transformed based on the metadata for the 3D object identified in the frame and the second 3D object proxy can be transformed based on the metadata for the 3D object identified in the key frame.

In an example implementation, the first 3D object proxy and the second 3D object proxy are latent representations of 3D objects. Therefore, the first 3D object proxy can be used to regenerate a mesh representation for the first 3D object proxy and the second 3D object proxy can be used to regenerate a mesh representation for the second 3D object proxy. Decoding a latent representation for a 3D object using an autoencoder can regenerate a mesh representation including the color attributes for the 3D object as described above. The autoencoder can use a neural network with a structure read from the metadata.

In step S945 the selected frame is decompressed with a color prediction scheme using the stored 3D object (as a geometric proxy) for the 3D object. Initially, the selected frame can be entropy decoded, inverse quantized and inverse transformed to generate derivative residuals that can be identical to (or approximately identical to) the residuals generated by an encoder when encoding the selected frame and prior to transforming, quantizing and entropy the residuals.

In an example implementation, the prediction scheme includes matching points corresponding to the transformed (e.g., translated and oriented) stored 3D object to points of a key frame. Then, using the matched points to select or predict a pixel/block/patch in the key frame for use in regenerating color values for pixels of the 3D object in the selected frame.

Regenerating color values for pixels can include adding the pixel attribute values for each point in the triangular mesh for the 3D object from the pixel attribute values for each matched point of the predicted pixel/block/patch in the key frame to color values and/or color attributes for the translated and oriented stored 3D object based on the residuals at the identified position in the selected frame. The color values and/or color attributes for the remainder of the selected frame can be regenerated based on the residuals or the remainder of the selected frame and the corresponding pixels/blocks/patches of the key frame.

In an example implementation, the transformed first 3D object proxy can be wrapped (with a color and/or a texture) corresponding to the 3D object identified in the frame. In other words, the transformed first 3D object proxy can be wrapped with residuals corresponding to the 3D object identified in the frame. Further, the transformed second 3D object proxy can be can be wrapped (with a color and/or a texture) corresponding to the 3D object identified in the key frame. Color values for pixels for the 3D object can be regenerated by adding color attributes of a point in the mesh representation of the first 3D object proxy to color attributes of a corresponding point (e.g., having the same point identification or being in the same position in the mesh sequence) in the mesh representation of the second 3D object proxy. Mapping color attributes from the 3D object identified in the frame to the transformed first 3D object proxy can include converting the 3D object from a 3D space (e.g., an XYZ space) to a 2D space (e.g., a UV space) and or converting the 3D object identified in the frame 110 from a 2D space (e.g., a UV space) to a 3D space (e.g., an XYZ space).

In an example implementation, the first 3D object proxy and the second 3D object proxy are latent representations of 3D objects. Therefore, the first 3D object proxy can be used to regenerate a mesh representation including color attributes for the first 3D object proxy and the second 3D object proxy can be used to regenerate a mesh representation including color attributes for the second 3D object proxy. Decoding a latent representation for a 3D object using an autoencoder can regenerate a mesh representation including the color attributes for the 3D object as described above. The autoencoder can use a neural network with a structure read from the metadata.

In step S950 the transformed stored 3D object is stitched into the decompressed frame. The selected frame can be reconstructed based on the regenerated color values and/or color attributes for the translated and oriented stored 3D object and the regenerated color values and/or color attributes for the remainder of the selected frame. In an example implementation, the selected frame can be reconstruct by stitching the regenerated color values and/or color attributes for the translated and oriented stored 3D object into the regenerated color values and/or color attributes for the remainder of the selected frame based on the identified position of the 3D object (e.g., as read from the metadata.

In step S955 the frame including the 3D object is rendered. For example, regenerated texture data and regenerated color data can be rendered for display. Rendering the texture data and color data for display can include using a 3D shader (e.g., a vertex shader, a geometry shader, and/or the like) to draw the mesh associated with frame. The shader can be configured to generate primitives. The shader can be configured to transform each vertex's 3D position and texture in the mesh to the 2D coordinate (e.g., primitives) at which it appears on a display (e.g., display 640). Rendering the texture data and color data for display can also include performing rasterization. Rasterization can include using assigning pixel (e.g., color) values to the primitives based on the texture data and the color data.

In step S960 the rendered frame is color corrected. For example, color correction can include compensating for color differences between frames, compensating for color differences between multiple views of the same scene, correcting for object distortions (warping), correcting for object border distortion, and/or the like.

Example implementations can include identifying two or more 3D objects, regenerating color values and/or color attributes for each of the two or more 3D objects and reconstructing the selected frame using each of the two or more 3D objects. The video data 5 can be regenerated based on a plurality of reconstructed frames. The video data 5 can be rendered (e.g., texture data and color data), and color corrected for display on a display of the client device.

As discussed above, as the techniques described herein (e.g., the methods described above) are implemented for use with the increased number of videos. The number of stored 3D objects of interest (e.g., stored 3D objects 135) is sure to increase and the amount of resources (e.g., memory) necessary to store the 3D objects of interest will increase. Further, communicating the 3D objects of interest from a streaming server to client devices may require a significant amount of bandwidth during the streaming activity. Therefore, efficiently encoding and decoding 3D objects of interest can become desirable for streaming operations.

Figure 10:
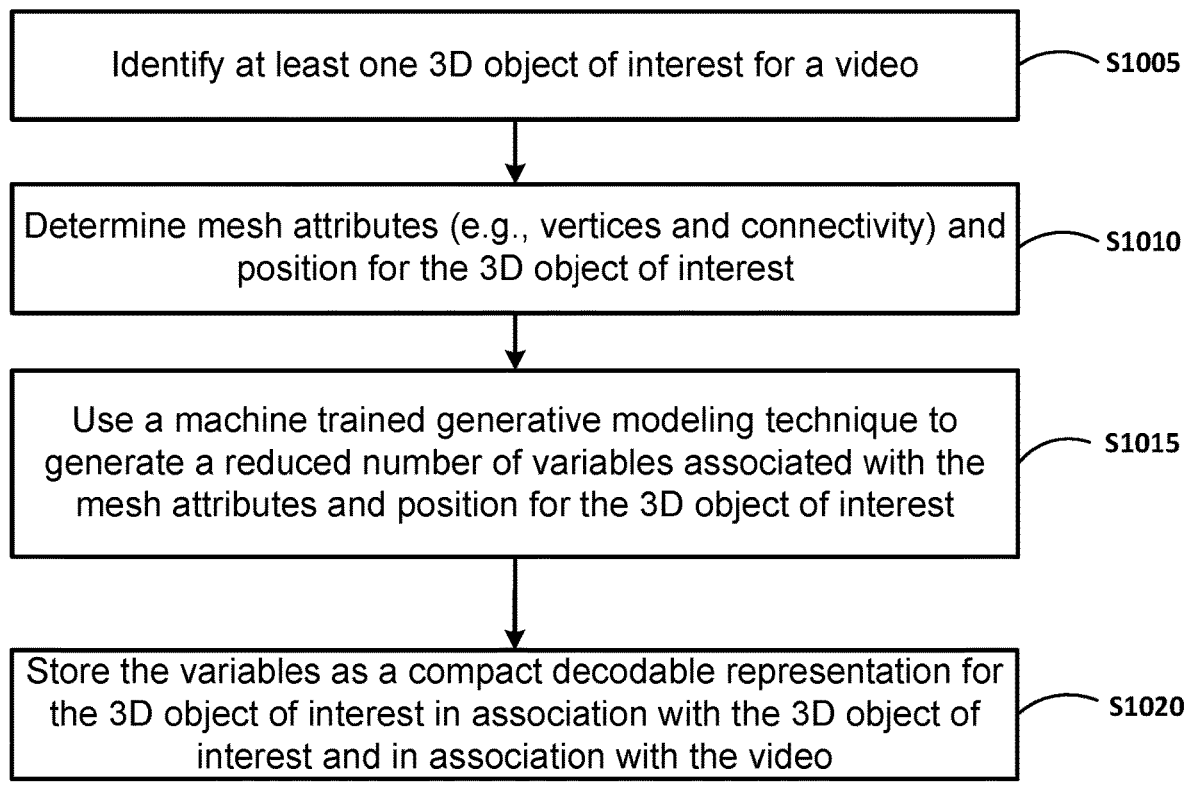
FIG. 10 illustrates a block diagram of a method for compressing a 3D object according to at least one example embodiment.

FIG. 10 illustrates a block diagram of a method for compressing a 3D object according to at least one example embodiment. As shown in FIG. 10, in step S1005 at least one 3D object of interest for a video is identified. For example, objects of interest can include 3D characters of a CGI movie including CGI actors (e.g., lead roles, supporting roles, and extras) CGI pets, CGI creatures, CGI monsters and the like. Objects of interest can include vehicles (e.g., a train, an automobile or a plane) or objects that can be moving in a predictable manner (e.g., at a constant speed and/or direction) from frame-to-frame. Objects of interest can include a stationary or fixed 3D object (e.g., a background of the scene, furniture at a fixed position within the scene or a slowly moving object in the distance) can be appear stationary (e.g., without any camera or scene translation) from frame-to-frame.

3D objects of interest can be predetermined and stored in association with a video. 3D objects of interest can be determined as needed (e.g., when selecting a key frame, as part of an initialization operation) and stored in association with a video or added to previously stored 3D objects of interest.

In step S1010 mesh attributes (e.g., vertices and connectivity) and position for the 3D object of interest are determined. According to an example implementation, each of the 3D object of interest can be defined by a mesh having a same number of points each having position coordinates. Other attributes of the points can be added as necessary. Accordingly, the mesh attributes for each of the 3D object of interest can include a same number of vertices with varying connectivity.

In step S1015 a machine trained generative modeling technique is used to generate a reduced number of variables associated with the mesh attributes and position for the 3D object of interest. For example, a VAE can be used to generate a reduced number of variables. This reduced number of variables is sometimes called a latent representation for a 3D object or a reduced latent representation for a 3D object. The VAE can include a neural network encoder and a neural network decoder each including a neural network having a same configuration of C filters, K×K mask and stride factor for the neural network. As a result the number of variables in the latent space for each of the latent representations for the 3D object of interest generated by the neural network encoder is the same for each of the 3D object of interest. Further, the number of points in the meshes that are regenerated by the neural network decoder is the same for each of the 3D object of interest.

In an example implementation, the mesh for each of the plurality of 3D objects of interest can be compressed (e.g., compressed using the technique describe above with regard to FIG. 5A). For example, the mesh for each of the plurality of 3D objects of interest can be compressed using generative modeling techniques (e.g., using a neural network, convolutional neural network, a VAE, and/or the like). The mesh for each of the plurality of 3D objects of interest can be compressed using a neural network encoder having a convolutional neural network with elements selected and trained based on a machine trained generative modeling technique configured to generate a reduced number of variables associated with the mesh attributes and position for each 3D object. The generated reduced number of variables associated with the mesh attributes and position for a 3D object is sometimes called a compact latent representation for the 3D object.

In step S1020 the variables are stored as a compact decodable representation (or a compact latent representation) for the 3D object of interest in association with the 3D object of interest and in association with the video. For example, the variables can be stored as the latent representations for 3D objects 510. The latent representations for 3D objects 510 can be stored on a streaming server and/or a device including at least one encoder (e.g., encoder 105).

Figure 11:
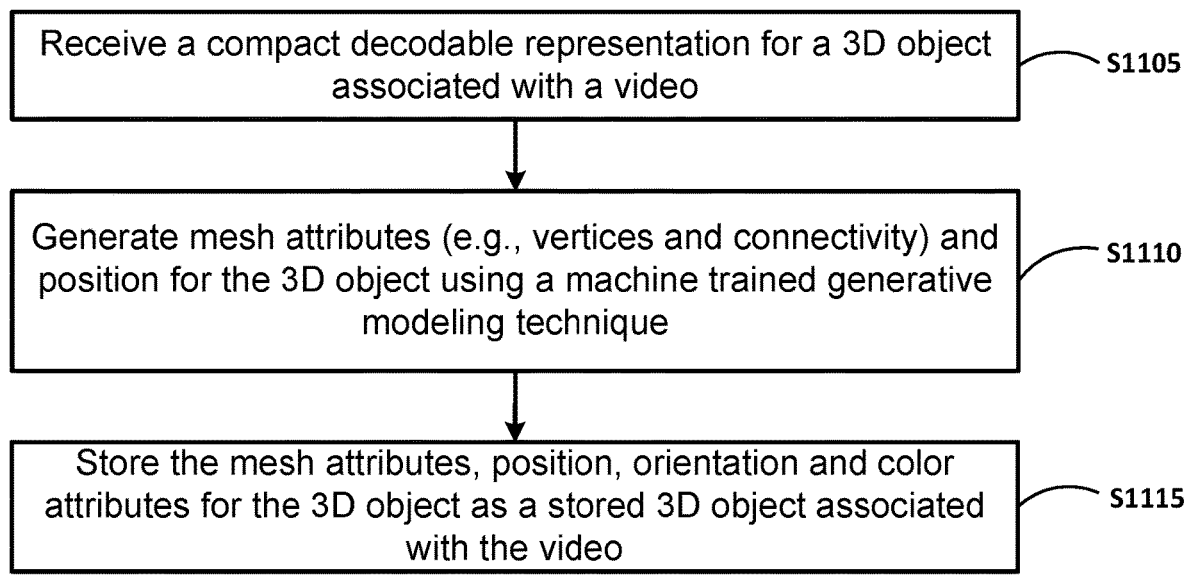
FIG. 11 illustrates a block diagram of a method for decompressing a 3D object according to at least one example embodiment.
Figure 12:
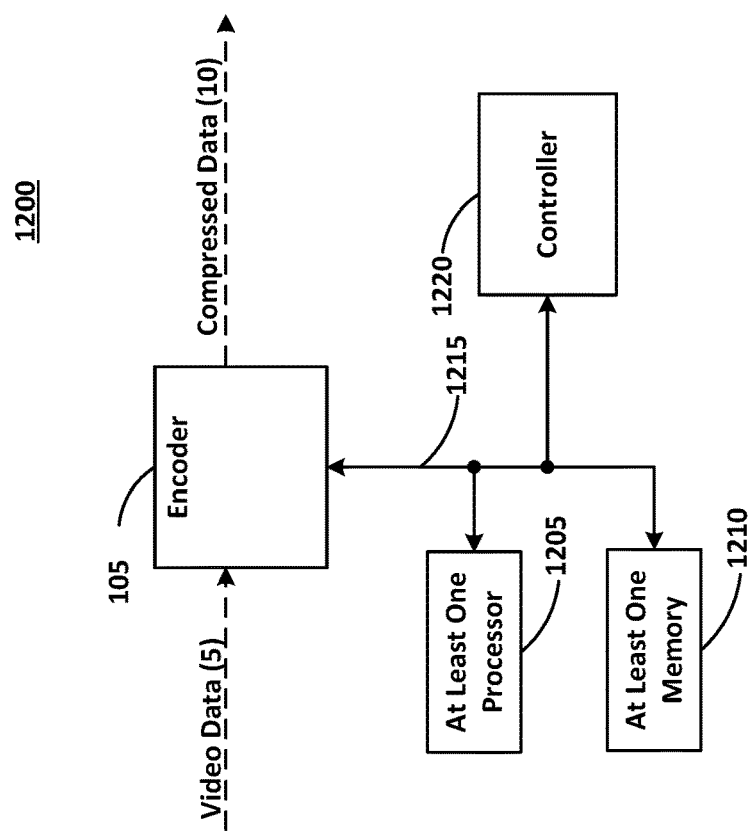
FIG. 12 illustrates a video encoder system according to at least one example embodiment.

FIG. 11 illustrates a block diagram of a method for decompressing a 3D object according to at least one example embodiment. As shown in FIG. 11, in step S1105 a compact decodable representation for a 3D object associated with a video is received. For example, variables stored as latent representations for 3D objects 510 can be stored on a streaming server and/or a device including at least one encoder (e.g., encoder 105). At least one set of variables stored as a latent representations for 3D objects can be received from the streaming server during a video streaming operation.

In step S1110 mesh attributes (e.g., vertices and connectivity) and position for the 3D object can be generated using a machine trained generative modeling technique. For example, a VAE can use variables in the latent space for the latent representations for a 3D object can be used as input to a neural network decoder and the VAE can regenerate the position coordinates for each point of the mesh. The configuration of the C filters, the K×K mask and the stride factor for the neural network can determine the number of points of the meshes that are regenerated. The neural network decoder can regenerate mesh attributes and position for the 3D object as the points of the mesh are regenerated.

In step S1115 the mesh attributes, position, orientation and color attributes for the 3D object are stored as a stored 3D object associated with the video. For example, as 3D objects are regenerated as a mesh including a collection of points connected by faces, the 3D objects can be stored as stored 3D objects 135. Each regenerated point can store various attributes. For example, the attributes can include positions, colors, texture coordinates, and the like of each point. Therefore, regenerated 3D objects included in the stored 3D objects 135 can be used in a color prediction scheme based on using a 3D object as a geometric proxy as implemented in a 3D encoder and/or 3D decoder.

FIG. 12 illustrates the video encoder system 1200 according to at least one example embodiment. As shown in FIG. 12, the video encoder system 1200 includes the at least one processor 1205, the at least one memory 1210, a controller 1220, and the video encoder 105. The at least one processor 1205, the at least one memory 1210, the controller 1220, and the video encoder 105 are communicatively coupled via bus 1215.

In the example of FIG. 12, a video encoder system 1200 may be, or include, at least one computing device and should be understood to represent virtually any computing device configured to perform the methods described herein. As such, the video encoder system 1200 may be understood to include various components which may be utilized to implement the techniques described herein, or different or future versions thereof. By way of example, the video encoder system 1200 is illustrated as including at least one processor 1205, as well as at least one memory 1210 (e.g., a non-transitory computer readable storage medium).

As may be appreciated, the at least one processor 1205 may be utilized to execute instructions stored on the at least one memory 1210, so as to thereby implement the various features and functions described herein, or additional or alternative features and functions. Of course, the at least one processor 1205 and the at least one memory 1210 may be utilized for various other purposes. In particular, it may be appreciated the at least one memory 1210 may be understood to represent an example of various types of memory and related hardware and software which might be used to implement any one of the modules described herein.

The at least one memory 1210 may be configured to store data and/or information associated with the video encoder system 1200. The at least one memory 1210 may be a shared resource. For example, the video encoder system 1200 may be an element of a larger system (e.g., a server, a personal computer, a mobile device, and the like). Therefore, the at least one memory 1210 may be configured to store data and/or information associated with other elements (e.g., image/video serving, web browsing or wired/wireless communication) within the larger system.

The controller 1220 may be configured to generate various control signals and communicate the control signals to various blocks in video encoder system 1200. The controller 1220 may be configured to generate the control signals to implement the techniques described above. The controller 1220 may be configured to control the video encoder 1225 to encode an image, a sequence of images, a video frame, a video sequence, and the like according to example embodiments. For example, the controller 1220 may generate control signals corresponding to video quality.

The video encoder 105 may be configured to receive a video stream input 5 and output compressed (e.g., encoded) video bits 10. The video encoder 105 may convert the video stream input 5 into discrete video frames. The video stream input 5 may also be an image, accordingly, the compressed (e.g., encoded) video bits 10 may also be compressed image bits. The video encoder 105 may further convert each discrete video frame (or image) into a matrix of blocks (hereinafter referred to as blocks). For example, a video frame (or image) may be converted to a 16×16, a 16×8, an 8×8, a 4×4 or a 2×2 matrix of blocks each having a number of pixels. Although five example matrices are listed, example embodiments are not limited thereto.

The compressed video bits 10 may represent the output of the video encoder system 1200. For example, the compressed video bits 10 may represent an encoded video frame (or an encoded image). For example, the compressed video bits 10 may be ready for transmission to a receiving device (not shown). For example, the video bits may be transmitted to a system transceiver (not shown) for transmission to the receiving device.

The at least one processor 1205 may be configured to execute computer instructions associated with the controller 1220 and/or the video encoder 105. The at least one processor 1205 may be a shared resource. For example, the video encoder system 1200 may be an element of a larger system (e.g., a mobile device, a server, a streaming server, and/or the like). Therefore, the at least one processor 1205 may be configured to execute computer instructions associated with other elements (e.g., image/video serving, web browsing or wired/wireless communication) within the larger system.

In an example implementation, the video encoder system 1200 can be implemented as or in graphics card and/or chip (e.g., an ASIC on a computer mother board) including a graphics processing unit (GPU) configured to remove load from a central processing unit (CPU). The at least one processor 1205 may be implemented as a GPU configured to process large blocks of video data in parallel. The GPU can be configured to process (e.g., compress) mesh data and generate pixel data from mesh data. The at least one memory 1210 may include video memory and driver software. The video memory can be a frame buffer that stores digital data representing the image or scene of a frame. The video memory can store digital data before and after processing by the GPU. The driver software can include codecs configured to decompress video data. The codecs can include implementing the color prediction scheme based on using a 3D object as a geometric proxy as described herein.

FIG. 13 illustrates the video decoder system 1300 according to at least one example embodiment. As shown in FIG. 13, the video decoder system 1300 includes the at least one processor 1305, the at least one memory 1310, a controller 1320, and the video decoder 145. The at least one processor 1305, the at least one memory 1310, the controller 1320, and the video decoder 145 are communicatively coupled via bus 1315.

In the example of FIG. 13, a video decoder system 1300 may be at least one computing device and should be understood to represent virtually any computing device configured to perform the methods described herein. As such, the video decoder system 1300 may be understood to include various components which may be utilized to implement the techniques described herein, or different or future versions thereof. By way of example, the video decoder system 1300 is illustrated as including at least one processor 1305, as well as at least one memory 1310 (e.g., a computer readable storage medium).

Thus, as may be appreciated, the at least one processor 1305 may be utilized to execute instructions stored on the at least one memory 1310, so as to thereby implement the various features and functions described herein, or additional or alternative features and functions. Of course, the at least one processor 1305 and the at least one memory 1310 may be utilized for various other purposes. In particular, it may be appreciated the at least one memory 1310 may be understood to represent an example of various types of memory and related hardware and software which might be used to implement any one of the modules described herein. According to example embodiments, the video encoder system 1200 and the video decoder system 1300 may be included in a same larger system (e.g., a personal computer, a mobile device and the like).

The at least one memory 1310 may be configured to store data and/or information associated with the video decoder system 1300. The at least one memory 1310 may be a shared resource. For example, the video decoder system 1300 may be an element of a larger system (e.g., a personal computer, a mobile device, and the like). Therefore, the at least one memory 1310 may be configured to store data and/or information associated with other elements (e.g., web browsing or wireless communication) within the larger system.

The controller 1320 may be configured to generate various control signals and communicate the control signals to various blocks in video decoder system 1300. The controller 1320 may be configured to generate the control signals in order to implement the video encoding/decoding techniques described below. The controller 1320 may be configured to control the video decoder 145 to decode a video frame according to example embodiments.

The video decoder 145 may be configured to receive a compressed (e.g., encoded) video bits 10 input and output a video stream 5. The video decoder 145 may convert discrete video frames of the compressed video bits 10 into the video stream 5. The compressed (e.g., encoded) video bits 10 may also be compressed image bits, accordingly, the video stream 5 may also be an image.

The at least one processor 1305 may be configured to execute computer instructions associated with the controller 1320 and/or the video decoder 145. The at least one processor 1305 may be a shared resource. For example, the video decoder system 1300 may be an element of a larger system (e.g., a personal computer, a mobile device, and the like). Therefore, the at least one processor 1305 may be configured to execute computer instructions associated with other elements (e.g., web browsing or wireless communication) within the larger system.

In an example implementation, the video decoder system 1300 can be implemented as or in graphics card and/or chip (e.g., an ASIC on a computer mother board) including a graphics processing unit (GPU) configured to remove load from a central processing unit (CPU). The at least one processor 1305 may be implemented as a GPU configured to process large blocks of video data in parallel. The GPU can be configured to process (e.g., decompress) mesh data and generate pixel data from mesh data. The at least one memory 1310 may include video memory and driver software. The video memory can be a frame buffer that stores digital data representing the image or scene of a frame. The video memory can store digital data before and after processing by the GPU. The driver software can include codecs configured to decompress video data. The codecs can include implementing the color prediction scheme based on using a 3D object as a geometric proxy as described herein.

Figure 14:
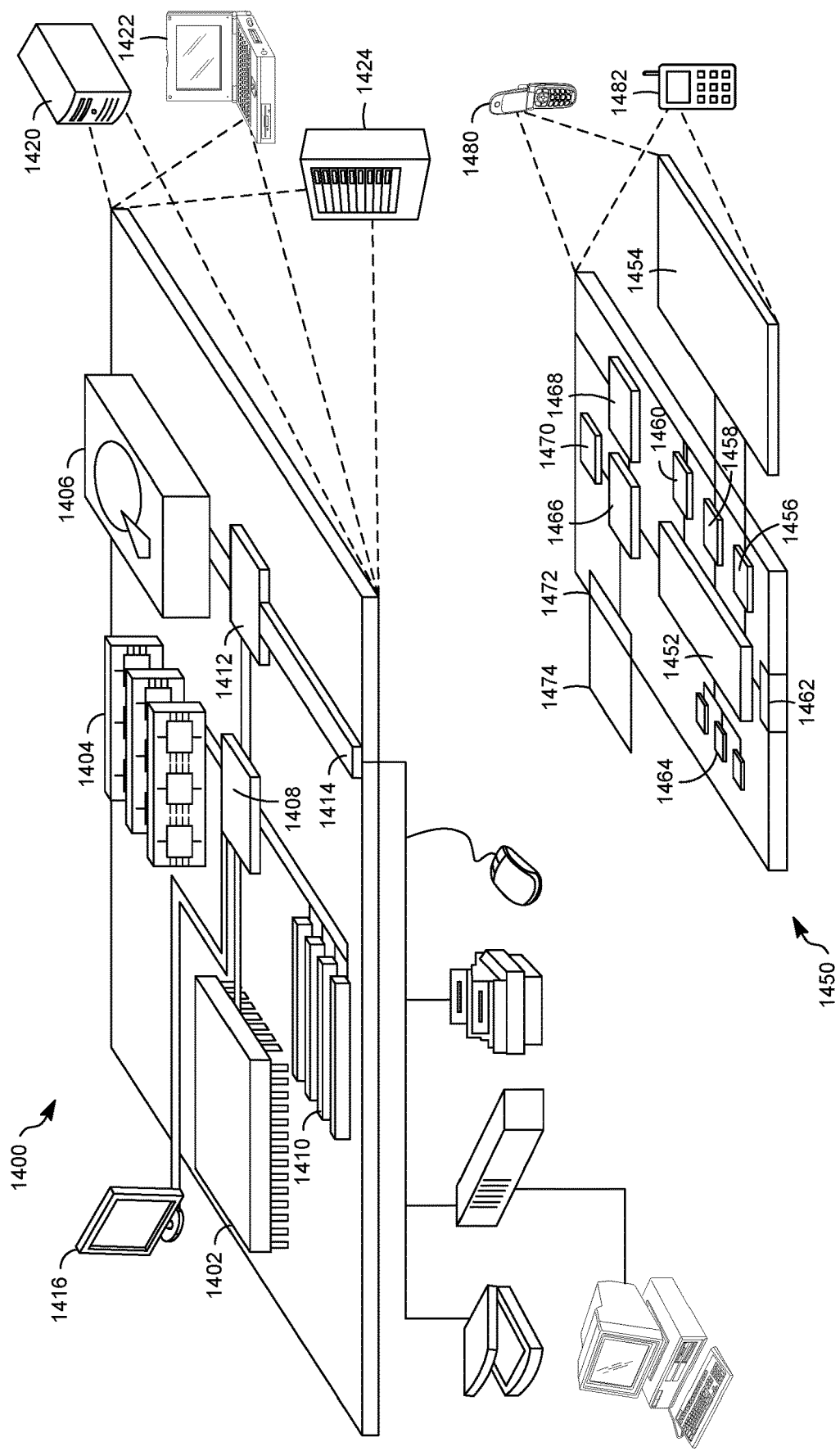
FIG. 14 shows an example of a computer device and a mobile computer device according to at least one example embodiment.

FIG. 14 shows an example of a computer device 1400 and a mobile computer device 1450, which may be used with the techniques described here. Computing device 1400 is intended to represent various forms of digital computers, such as laptops, desktops, workstations, personal digital assistants, servers, blade servers, mainframes, and other appropriate computers. Computing device 1450 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 1400 includes a processor 1402, memory 1404, a storage device 1406, a high-speed interface 1408 connecting to memory 1404 and high-speed expansion ports 1410, and a low speed interface 1412 connecting to low speed bus 1414 and storage device 1406. Each of the components 1402, 1404, 1406, 1408, 1410, and 1412, are interconnected using various busses, and may be mounted on a common motherboard or in other manners as appropriate. The processor 1402 can process instructions for execution within the computing device 1400, including instructions stored in the memory 1404 or on the storage device 1406 to display graphical information for a GUI on an external input/output device, such as display 1416 coupled to high speed interface 1408. In other implementations, multiple processors and/or multiple buses may be used, as appropriate, along with multiple memories and types of memory. Also, multiple computing devices 1400 may be connected, with each device providing portions of the necessary operations (e.g., as a server bank, a group of blade servers, or a multi-processor system).

The memory 1404 stores information within the computing device 1400. In one implementation, the memory 1404 is a volatile memory unit or units. In another implementation, the memory 1404 is a non-volatile memory unit or units. The memory 1404 may also be another form of computer-readable medium, such as a magnetic or optical disk.

The storage device 1406 is capable of providing mass storage for the computing device 1400. In one implementation, the storage device 1406 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 1404, the storage device 1406, or memory on processor 1402.

The high speed controller 1408 manages bandwidth-intensive operations for the computing device 1400, while the low speed controller 1412 manages lower bandwidth-intensive operations. Such allocation of functions is exemplary only. In one implementation, the high-speed controller 1408 is coupled to memory 1404, display 1416 (e.g., through a graphics processor or accelerator), and to high-speed expansion ports 1410, which may accept various expansion cards (not shown). In the implementation, low-speed controller 1412 is coupled to storage device 1406 and low-speed expansion port 1414. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 1400 may be implemented in a number of different forms, as shown in the figure. For example, it may be implemented as a standard server 1420, or multiple times in a group of such servers. It may also be implemented as part of a rack server system 1424. In addition, it may be implemented in a personal computer such as a laptop computer 1422. Alternatively, components from computing device 1400 may be combined with other components in a mobile device (not shown), such as device 1450. Each of such devices may contain one or more of computing device 1400, 1450, and an entire system may be made up of multiple computing devices 1400, 1450 communicating with each other.

Computing device 1450 includes a processor 1452, memory 1464, an input/output device such as a display 1454, a communication interface 1466, and a transceiver 1468, among other components. The device 1450 may also be provided with a storage device, such as a microdrive or other device, to provide additional storage. Each of the components 1450, 1452, 1464, 1454, 1466, and 1468, are interconnected using various buses, and several of the components may be mounted on a common motherboard or in other manners as appropriate.

The processor 1452 can execute instructions within the computing device 1450, including instructions stored in the memory 1464. The processor may be implemented as a chipset of chips that include separate and multiple analog and digital processors. The processor may provide, for example, for coordination of the other components of the device 1450, such as control of user interfaces, applications run by device 1450, and wireless communication by device 1450.

Processor 1452 may communicate with a user through control interface 1458 and display interface 1456 coupled to a display 1454. The display 1454 may be, for example, a TFT LCD (Thin-Film-Transistor Liquid Crystal Display) or an OLED (Organic Light Emitting Diode) display, or other appropriate display technology. The display interface 1456 may comprise appropriate circuitry for driving the display 1454 to present graphical and other information to a user. The control interface 1458 may receive commands from a user and convert them for submission to the processor 1452. In addition, an external interface 1462 may be provide in communication with processor 1452, to enable near area communication of device 1450 with other devices. External interface 1462 may provide, for example, for wired communication in some implementations, or for wireless communication in other implementations, and multiple interfaces may also be used.

The memory 1464 stores information within the computing device 1450. The memory 1464 can be implemented as one or more of a computer-readable medium or media, a volatile memory unit or units, or a non-volatile memory unit or units. Expansion memory 1474 may also be provided and connected to device 1450 through expansion interface 1472, which may include, for example, a SIMM (Single In Line Memory Module) card interface. Such expansion memory 1474 may provide extra storage space for device 1450, or may also store applications or other information for device 1450. Specifically, expansion memory 1474 may include instructions to carry out or supplement the processes described above, and may include secure information also. Thus, for example, expansion memory 1474 may be provide as a security module for device 1450, and may be programmed with instructions that permit secure use of device 1450. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 1464, expansion memory 1474, or memory on processor 1452, that may be received, for example, over transceiver 1468 or external interface 1462.

Device 1450 may communicate wirelessly through communication interface 1466, which may include digital signal processing circuitry where necessary. Communication interface 1466 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 1468. In addition, short-range communication may occur, such as using a Bluetooth, Wi-Fi, or other such transceiver (not shown). In addition, GPS (Global Positioning System) receiver module 1470 may provide additional navigation- and location-related wireless data to device 1450, which may be used as appropriate by applications running on device 1450.

Device 1450 may also communicate audibly using audio codec 1460, which may receive spoken information from a user and convert it to usable digital information. Audio codec 1460 may likewise generate audible sound for a user, such as through a speaker, e.g., in a handset of device 1450. Such sound may include sound from voice telephone calls, may include recorded sound (e.g., voice messages, music files, etc.) and may also include sound generated by applications operating on device 1450.

The computing device 1450 may be implemented in a number of different forms, as shown in the figure. For example, it may be implemented as a cellular telephone 1480. It may also be implemented as part of a smart phone 1482, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device. Various implementations of the systems and techniques described here can be realized as and/or generally be referred to herein as a circuit, a module, a block, or a system that can combine software and hardware aspects. For example, a module may include the functions/acts/computer program instructions executing on a processor (e.g., a processor formed on a silicon substrate, a GaAs substrate, and the like) or some other programmable data processing apparatus.

Some of the above example embodiments are described as processes or methods depicted as flowcharts. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Methods discussed above, some of which are illustrated by the flow charts, may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a storage medium. A processor(s) may perform the necessary tasks.

Specific structural and functional details disclosed herein are merely representative for purposes of describing example embodiments. Example embodiments, however, be embodied in many alternate forms and should not be construed as limited to only the embodiments set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term and/or includes any and all combinations of one or more of the associated listed items.

It will be understood that when an element is referred to as being connected or coupled to another element, it can be directly connected or coupled to the other element or intervening elements may be present. In contrast, when an element is referred to as being directly connected or directly coupled to another element, there are no intervening elements present. Other words used to describe the relationship between elements should be interpreted in a like fashion (e.g., between versus directly between, adjacent versus directly adjacent, etc.).

The terminology used herein is for the purpose of describing particular embodiments only and is not intended to be limiting of example embodiments. As used herein, the singular forms a, an and the are intended to include the plural forms as well, unless the context clearly indicates otherwise. It will be further understood that the terms comprises, comprising, includes and/or including, when used herein, specify the presence of stated features, integers, steps, operations, elements and/or components, but do not preclude the presence or addition of one or more other features, integers, steps, operations, elements, components and/or groups thereof.

It should also be noted that in some alternative implementations, the functions/acts noted may occur out of the order noted in the figures. For example, two figures shown in succession may in fact be executed concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Portions of the above example embodiments and corresponding detailed description are presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

In the above illustrative embodiments, reference to acts and symbolic representations of operations (e.g., in the form of flowcharts) that may be implemented as program modules or functional processes include routines, programs, objects, components, data structures, etc., that perform particular tasks or implement particular abstract data types and may be described and/or implemented using existing hardware at existing structural elements. Such existing hardware may include one or more Central Processing Units (CPUs), digital signal processors (DSPs), application-specific-integrated-circuits, field programmable gate arrays (FPGAs) computers or the like.

It should be borne in mind, however, that all of these and similar terms are to be associated with the appropriate physical quantities and are merely convenient labels applied to these quantities. Unless specifically stated otherwise, or as is apparent from the discussion, terms such as processing or computing or calculating or determining of displaying or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the example embodiments are typically encoded on some form of non-transitory program storage medium or implemented over some type of transmission medium. The program storage medium may be magnetic (e.g., a floppy disk or a hard drive) or optical (e.g., a compact disk read only memory, or CD ROM), and may be read only or random access. Similarly, the transmission medium may be twisted wire pairs, coaxial cable, optical fiber, or some other suitable transmission medium known to the art. The example embodiments not limited by these aspects of any given implementation.

Lastly, it should also be noted that whilst the accompanying claims set out particular combinations of features described herein, the scope of the present disclosure is not limited to the particular combinations hereafter claimed, but instead extends to encompass any combination of features or embodiments herein disclosed irrespective of whether or not that particular combination has been specifically enumerated in the accompanying claims at this time.

What is claimed is:

1. A method comprising:
    receiving a frame of a video;
    identifying a three-dimensional (3D) object in the frame;
    matching the 3D object to a stored 3D object;
    generating a first 3D object proxy based on the stored 3D object;
    transforming the first 3D object proxy based on the 3D object identified in the frame;
    compressing the frame of the video using a color prediction scheme based on the transformed first 3D object proxy and a transformed second 3D object proxy based on the stored 3D object; and
    storing the compressed frame with metadata, the metadata identifying the 3D object, indicating a position of the 3D object in the frame of the video and indicating an orientation of the 3D object in the frame of the video.

2. The method of claim 1, wherein the compressing of the frame of the video using the color prediction scheme based on the 3D object and the stored 3D object includes:
    generating the second 3D object proxy based on the stored 3D object;
    identifying the 3D object in a key frame of the video;

transforming the second 3D object proxy based on the 3D object identified in the key frame;
mapping color attributes from the 3D object to the transformed first 3D object proxy;
mapping color attributes from the 3D object identified in the key frame to the transformed second 3D object proxy; and
generating residuals for the 3D object based on the color attributes for the transformed first 3D object proxy and the color attributes for the transformed second 3D object proxy.

3. The method of claim 1, wherein the compressing of the frame of the video using the color prediction scheme based on the 3D object and the stored 3D object includes:
generating the second 3D object proxy based on the stored 3D object;
identifying the 3D object in a key frame of the video;
transforming the second 3D object proxy based on the 3D object identified in the key frame;
mapping color attributes from the 3D object to the transformed first 3D object proxy; and
generating residuals for the 3D object based on the color attributes for the transformed first 3D object proxy and default color attributes for the transformed second 3D object proxy.

4. The method of claim 1, wherein the compressing of the frame of the video using the color prediction scheme based on the 3D object and the stored 3D object includes:
encoding the first 3D object proxy using an auto encoder, wherein the transforming the first 3D object proxy includes transforming the encoded first 3D object proxy based on the 3D object identified in the frame;
generating the second 3D object proxy based on the stored 3D object;
encoding the second 3D object proxy using an autoencoder;
identifying the 3D object in a key frame of the video;
transforming the encoded second 3D object proxy based on the 3D object identified in the key frame;
mapping color attributes from the 3D object to the transformed first 3D object proxy;
mapping color attributes from the 3D object identified in the key frame to the transformed second 3D object proxy; and
generating residuals for the 3D object based on the color attributes for the transformed first 3D object proxy and the color attributes for the transformed second 3D object proxy.

5. The method of claim 1, wherein the compressing of the frame of the video using the color prediction scheme based on the 3D object and the stored 3D object includes:
encoding the first 3D object proxy using an auto encoder, wherein the transforming the first 3D object proxy includes transforming the encoded first 3D object proxy based on the 3D object identified in the frame;
generating the second 3D object proxy based on the stored 3D object;
encoding the second 3D object proxy using an autoencoder;
identifying the 3D object in a key frame of the video;
transforming the encoded second 3D object proxy based on the 3D object identified in the key frame;
mapping color attributes from the 3D object to the transformed first 3D object proxy; and
generating residuals for the 3D object based on the color attributes for the transformed first 3D object proxy and default color attributes for the transformed second 3D object proxy.

6. The method of claim 1, further comprising:
before storing the 3D object:
identifying at least one 3D object of interest associated with the video;
determining a plurality of mesh attributes associated with the 3D object of interest;
determining a position associated with the 3D object of interest;
determining an orientation associated with the 3D object of interest;
determining a plurality of color attributes associated with the 3D object of interest; and
reducing a number of variables associated with the mesh attributes for the 3D object of interest using an autoencoder.

7. The method of claim 1, wherein compressing the frame of the video includes determining position coordinates of the 3D object relative to an origin coordinate of a background 3D object in a key frame.

8. The method of claim 1, wherein
the stored 3D object includes default color attributes, and
the color prediction scheme uses the default color attributes.

9. The method of claim 1, further comprising:
identifying at least one 3D object of interest associated with the video;
generating at least one stored 3D object based on the at least one 3D object of interest, each of the at least one stored 3D object being defined by a mesh including a collection of points connected by faces, each point storing at least one attribute, the at least one attribute including a position coordinate for the respective point; and
storing the at least one stored 3D object in association with the video.

10. A method comprising:
receiving a frame of a video;
identifying a three-dimensional (3D) object in the frame;
matching the 3D object to a stored 3D object;
generating a 3D object proxy based on the stored 3D object;
transforming the 3D object proxy based on the 3D object identified in the frame;
mapping color attributes from the 3D object to the transformed 3D object proxy;
compressing the frame of the video using a color prediction scheme based on the transformed 3D object proxy, a second transformed 3D object proxy and the stored 3D object; and
storing the frame of the video.

11. The method of claim 10, wherein the 3D object proxy is a first 3D object proxy and the compressing of the frame of the video using the color prediction scheme based on the 3D object and the stored 3D object includes:
generating the second 3D object proxy based on the stored 3D object;
identifying the 3D object in a key frame of the video;
transforming the second 3D object proxy as the second transformed 3D object proxy based on the 3D object identified in the key frame;
mapping color attributes from the 3D object identified in the key frame to the transformed second 3D object proxy; and generating color attributes for the 3D object based on the color attributes for the transformed first 3D object proxy and the color attributes for the transformed second 3D object proxy.

12. The method of claim 10, wherein the 3D object proxy is a first 3D object proxy and the compressing of the frame of the video using the color prediction scheme based on the 3D object and the stored 3D object includes:
   encoding the first 3D object proxy using an autoencoder;
   transforming the encoded first 3D object proxy based on metadata associated with the 3D object;
   generating the second 3D object proxy based on the stored 3D object;
   encoding the second 3D object proxy using an autoencoder;
   identifying the 3D object in a key frame of the video;
   transforming the encoded second 3D object proxy as the second transformed 3D object proxy based on metadata associated with the 3D object identified in the key frame;
   mapping color attributes from the 3D object identified in the key frame to the transformed second 3D object proxy; and
   generating color attributes for the 3D object based on the color attributes for the transformed first 3D object proxy and the color attributes for the transformed second 3D object proxy.

13. The method of claim 10, wherein the 3D object proxy is a first 3D object proxy and the compressing of the frame of the video using the color prediction scheme based on the 3D object and the stored 3D object includes:
   encoding the first 3D object proxy using an autoencoder;
   transforming the encoded first 3D object proxy based on metadata associated with the 3D object;
   generating the second 3D object proxy based on the stored 3D object;
   encoding the second 3D object proxy using an autoencoder;
   identifying the 3D object in a key frame of the video;
   transforming the encoded second 3D object proxy as the second transformed 3D object proxy based on metadata associated with the 3D object identified in the key frame; and
   generating color attributes for the 3D object based on the color attributes for the transformed first 3D object proxy and default attributes for the transformed second 3D object proxy.

14. The method of claim 10, further comprising:
   receiving at least one latent representation for a 3D shape; and
   using a machine trained generative modeling technique to:
      determine a plurality of mesh attributes associated with the 3D shape;
      determining a position associated with the 3D shape;
      determining an orientation associated with the 3D shape; and
      determining a plurality of color attributes associated with the 3D shape; and
   storing the 3D shape as the stored 3D object.

15. The method of claim 10, further comprising:
   receiving a neural network used by an encoder of an autoencoder to reduce a number of variables associated with mesh attributes, position, orientation and color attributes for at least one 3D object of interest;
   generating points associated with a mesh for the at least one 3D object of interest using the neural network in an encoder of the autoencoder, the generation of the points including generating position attributes, orientation attributes and color attributes; and
   storing the at least one 3D object of interest as the stored 3D object.

16. A method comprising:
   receiving a frame of a video;
   identifying a three-dimensional (3D) object in the frame;
   matching the 3D object to a stored 3D object;
   generating a 3D object proxy based on the stored 3D object;
   encoding the 3D object proxy using an autoencoder;
   transforming the encoded 3D object proxy as a first transformed 3D object proxy based on metadata associated with the 3D object;
   compressing the frame of the video using a color prediction scheme based on the transformed 3D object proxy, a second transformed 3D object proxy, and the stored 3D object; and
   storing the frame of the video.

17. The method of claim 16, wherein the 3D object proxy is a first 3D object proxy and the compressing of the frame of the video using the color prediction scheme based on the 3D object and the stored 3D object includes:
   generating the second 3D object proxy based on the stored 3D object;
   identifying the 3D object in a key frame of the video;
   transforming the second 3D object proxy as the second transformed 3D object proxy based on the 3D object identified in the key frame;
   mapping color attributes from the 3D object to the transformed first 3D object proxy;
   mapping color attributes from the 3D object identified in the key frame to the transformed second 3D object proxy; and
   generating color attributes for the 3D object based on the color attributes for the transformed first 3D object proxy and the color attributes for the transformed second 3D object proxy.

18. The method of claim 16, wherein the 3D object proxy is a first 3D object proxy and the compressing of the frame of the video using the color prediction scheme based on the 3D object and the stored 3D object includes:
   encoding the first 3D object proxy using an autoencoder;
   transforming the encoded first 3D object proxy based on metadata associated with the 3D object;
   generating the second 3D object proxy based on the stored 3D object;
   encoding the second 3D object proxy using an autoencoder;
   identifying the 3D object in a key frame of the video;
   transforming the encoded second 3D object proxy as the second transformed 3D object proxy based on metadata associated with the 3D object identified in the key frame;
   mapping color attributes from the 3D object to the transformed first 3D object proxy;
   mapping color attributes from the 3D object identified in the key frame to the transformed second 3D object proxy; and
   generating color attributes for the 3D object based on the color attributes for the transformed first 3D object proxy and the color attributes for the transformed second 3D object proxy.

19. The method of claim 16, wherein the 3D object proxy is a first 3D object proxy and the compressing of the frame of the video using the color prediction scheme based on the 3D object and the stored 3D object includes:
    encoding the first 3D object proxy using an autoencoder;
    transforming the encoded first 3D object proxy based on metadata associated with the 3D object;
    generating the second 3D object proxy based on the stored 3D object;
    encoding the second 3D object proxy using an autoencoder;
    identifying the 3D object in a key frame of the video;
    transforming the encoded second 3D object proxy as the second transformed 3D object proxy based on metadata associated with the 3D object identified in the key frame;
    mapping color attributes from the 3D object to the transformed first 3D object proxy; and
    generating color attributes for the 3D object based on the color attributes for the transformed first 3D object proxy and default attributes for the transformed second 3D object proxy.

20. The method of claim 16, further comprising:
receiving at least one latent representation for a 3D shape; and
using a machine trained generative modeling technique to:
    determine a plurality of mesh attributes associated with the 3D shape;
    determining a position associated with the 3D shape;
    determining an orientation associated with the 3D shape; and
    determining a plurality of color attributes associated with the 3D shape; and
storing the 3D shape as the stored 3D object.

21. The method of claim 16, further comprising:
receiving a neural network used by an encoder of an autoencoder to reduce a number of variables associated with mesh attributes, position, orientation and color attributes for at least one 3D object of interest;
generating points associated with a mesh for the at least one 3D object of interest using the neural network in an encoder of the autoencoder, the generation of the points including generating position attributes, orientation attributes and color attributes; and
storing the at least one 3D object of interest as the stored 3D object.

* * * * *